(12) United States Patent
Klaedtke

(10) Patent No.: US 11,809,430 B2
(45) Date of Patent: Nov. 7, 2023

(54) EFFICIENT STREAM PROCESSING WITH DATA AGGREGATIONS IN A SLIDING WINDOW OVER OUT-OF-ORDER DATA STREAMS

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 679 days.

(21) Appl. No.: 16/804,214

(22) Filed: Feb. 28, 2020

(65) Prior Publication Data

US 2021/0124746 A1    Apr. 29, 2021

Related U.S. Application Data

(60) Provisional application No. 62/924,709, filed on Oct. 23, 2019.

(51) Int. Cl.
| | | |
|---|---|---|
| *G06F 7/14* | (2006.01) | |
| *G06F 7/32* | (2006.01) | |
| *G06F 16/2455* | (2019.01) | |
| *H04L 9/40* | (2022.01) | |

(52) U.S. Cl.
CPC .......... *G06F 16/24568* (2019.01); *G06F 7/14* (2013.01); *G06F 16/24556* (2019.01); *H04L 63/1416* (2013.01); *H04L 63/20* (2013.01)

(58) Field of Classification Search
CPC ......... G06F 16/24568; G06F 16/24556; G06F 7/14; H04L 63/1416; H04L 63/20
USPC .......................................................... 726/1
See application file for complete search history.

(56) References Cited

U.S. PATENT DOCUMENTS

| | | | |
|---|---|---|---|
| 7,882,087 B2* | 2/2011 | Johnson | G06F 16/2393 707/700 |
| 10,114,689 B1* | 10/2018 | Yang | H04L 65/612 |
| 10,360,035 B2 | 7/2019 | Kuo | |
| 2003/0121046 A1* | 6/2003 | Roy | H04N 21/439 725/90 |
| 2009/0182779 A1* | 7/2009 | Johnson | G06F 16/24568 |

(Continued)

FOREIGN PATENT DOCUMENTS

| | | | |
|---|---|---|---|
| CN | 103348325 | * | 10/2011 |
| CN | 107124329 A | | 9/2017 |

(Continued)

OTHER PUBLICATIONS

Brian Babcock; Models and Issues in Data Stream Systems; ACM: 2002; pp. 1-16.*

(Continued)

*Primary Examiner* — Monjur Rahim
(74) *Attorney, Agent, or Firm* — Leydig, Voit & Mayer, Ltd.

(57) ABSTRACT

A method for processing an out-of-order data stream includes inserting a new data stream element into a segment list according to a timestamp of the new data stream element. It is identified whether there are missing data stream elements between segments in the segment list. The segments which have no missing data stream elements between them are merged. Values of the data stream elements are aggregated using a sliding window over out-of-order data stream elements in the merged segment.

18 Claims, 20 Drawing Sheets

(56) References Cited

U.S. PATENT DOCUMENTS

| | | | | |
|---|---|---|---|---|
| 2015/0248461 A1* | 9/2015 | Theeten | ............... | G06F 16/2433 |
| | | | | 707/718 |
| 2016/0012110 A1* | 1/2016 | Hirzel | ................. | G06F 16/2246 |
| | | | | 707/797 |
| 2017/0228357 A1* | 8/2017 | Hirzel | ..................... | G06F 40/18 |
| 2017/0244984 A1* | 8/2017 | Aggarwal | ............... | H04N 5/222 |
| 2019/0215340 A1* | 7/2019 | Klaedtke | ................. | H04L 63/14 |
| 2019/0313157 A1* | 10/2019 | Fitzgerald | ........... | H04N 21/2747 |

FOREIGN PATENT DOCUMENTS

| | | |
|---|---|---|
| CN | 106250395 B | 8/2019 |
| EP | 3588914 A1 | 1/2020 |
| WO | WO 2019140732 A1 | 7/2019 |

OTHER PUBLICATIONS

Traub, Jonas et al., "Scotty: Efficient Window Aggregation for out-of-order Stream Processing," 34th IEEE International Conference on Data Engineering, Apr. 16-19, 2018.

Stonebraker, Michael et al. "The 8 Requirements of Real-Time Stream Processing," Sigmod Record 34(4), Dec. 2005.

Pugh, William, "Skip Lists: A Probabilistic Alternative to Balanced Trees," Communications of the ACM 33(6), Jun. 1990.

Akidau, Tyler et al. "MillWheel: Fault-Tolerant Stream Processing at Internet Scale," PVLDB, 6(11): 1033-1044, Aug. 26-30, 2013.

Tangwongsan, Kanat et al. "Optimal and General Out-of-Order Sliding-Window Aggregation," PVLDB, 12(10): 1167-1180, Jun. 2019.

Basin, David et al. "Runtime Verification over Out-of-order Streams," ACM Trans. Comput. Logic 21, 1, Article 5, Sep. 2019.

Basin, David et al. "Greedily Computing Associative Aggregations on Sliding Windows," Information Processing Letters (IPL), 115(2):186-192, Feb. 2015.

Traub, Jonas et al. "Efficient Window Aggregation with General Stream Slicing," Proceedings of the $22^{nd}$ International Conference on Extending Database Technology (EDBT), Mar. 26-29, 2019.

Gulisano, Vincenzo et al. "Efficient data streaming multiway aggregation through concurrent algorithmic designs and new abstract data types," arXiv:1606.04746v1, Jun. 15, 2016.

Tangwongsan, Kanat et al. "Sub-O(log n) Out-of-Order Sliding-Window Aggregation," arXiv:1810.11308v1, Oct. 26, 2018.

Ji, Yuanzhen et al. "Quality-Driven Processing of Sliding Window Aggregates over Out-of-Order Data Streams," ACM DEBS'15, Oslo, Norway, Jun. 29-Jul. 3, 2015.

Oge, Yasin et al. "Wire-Speed Implementation of Sliding-Window Aggregate Operator over Out-of-Order Data Streams," IEEE 7th International Symposium on Embedded Multicore/Manycore System-on-Chip, Sep. 26-28, 2013.

Abe, Kota et al. "Aggregation Skip Graph: A Skip Graph Extension for Efficient Aggregation Query," AP2PS 2010 : the Second International Conference on Advances in P2P Systems, Iaria, Oct. 25-30, 2010.

Kraemer, Juergen and Seeger, Bernhard, "Semantics and Implementation of Continuous Sliding Window Queries over Data Streams," ACM Trans. Database Syst. 34, 1, Article 4, Apr. 2009, 49 pages.

* cited by examiner

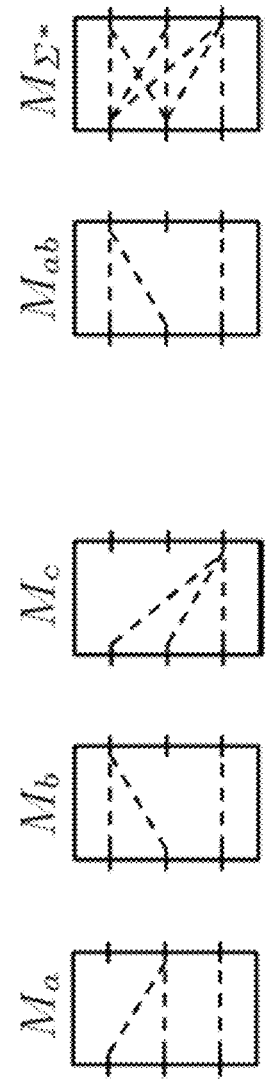
FIG. 14C
FIG. 14B
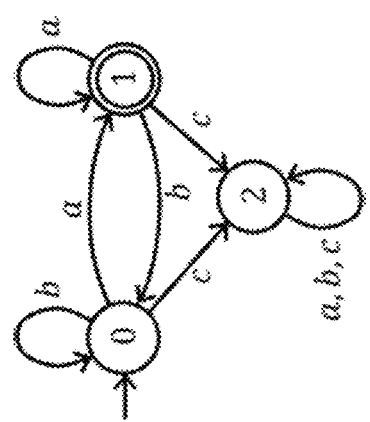
FIG. 14A

EFFICIENT STREAM PROCESSING WITH DATA AGGREGATIONS IN A SLIDING WINDOW OVER OUT-OF-ORDER DATA STREAMS

CROSS-REFERENCE TO PRIOR APPLICATION

Priority is claimed to U.S. Provisional Patent Application No. 62/924,709, filed on Oct. 23, 2019, the entire disclosure of which is hereby incorporated by reference herein.

FIELD

The present invention relates to a method and system for processing streams of data elements having out-of-order data elements.

BACKGROUND

Data, which is often machine generated nowadays, e.g., by the devices and components of an information technology (IT) system, is often and must often be processed and analyzed in real time. Continuous decisions are made based on the outcome of these analyses. Various stream processing frameworks, engines, and services exist for carrying out the analyses in real time by processing data streams online. For instance, APACHE FLINK is a state-of-the-art framework for stateful computations over data streams. The technical areas of application of these frameworks, engines, and services are numerous: (1) system monitoring, (2) system verification and debugging, (3) intrusion, surveillance, and fraud detection, (4) data mining, e.g., for advertising and electronic trading systems, and so on.

Jonas Traub, et al., "Scotty: Efficient Window Aggregation for out-of-order Stream Processing," 34th IEEE International Conference on Data Engineering (2019) in Section V, and in particular FIG. 3, provide an overview of an architecture/method for data aggregation which requires a stream slicer and uses watermarks to control how long one must wait for out-of-order elements before outputting results. Because a stream slicer is required, it is also required to have communication with an aggregate store.

SUMMARY

In an embodiment, the present invention provides a method for processing an out-of-order data stream. A new data stream element is inserted into a segment list according to a timestamp of the new data stream element. It is identified whether there are missing data stream elements between segments in the segment list. The segments which have no missing data stream elements between them are merged. Values of the data stream elements are aggregated using a sliding window over out-of-order data stream elements in the merged segment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 14A-14C show a graphical presentation of matrices for an automation, in particular, FIG. 14A is deterministic finite automation (DFA), FIG. 14B is the matrices and FIG. 14C is their combination;

DETAILED DESCRIPTION

In an embodiment, the present invention provides a method for processing out-of-order data streams efficiently. Out-of-order data streams include elements which are not necessarily ordered according to their creation time. The method provides a framework for processing out-of-order data streams in a pipeline, possibly with parallelized stages, and also provides for data aggregations in a sliding window over out-of-order data streams.

For generally illustrating the processing of data streams in real time for decision making, consider the following simple example, which falls into the technical areas (1) monitoring and (2) system verification and debugging mentioned above, to continuously count the number of failure events within a given time window (e.g., 30 seconds) and promptly trigger countermeasures whenever a given threshold (e.g., 10) is exceeded. A countermeasure could be the blocking, termination, or reconfiguration of certain system components.

Figure 1:
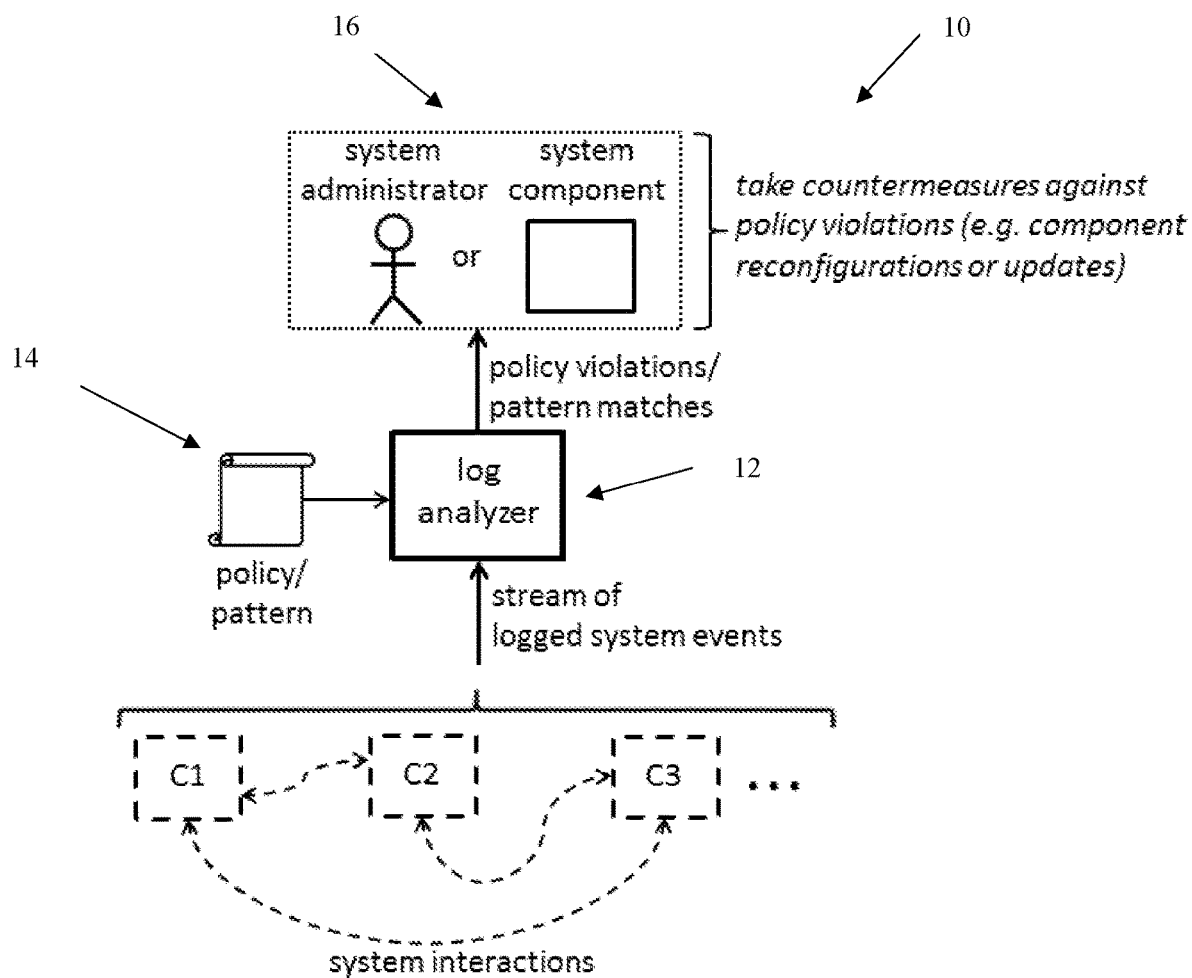
FIG. 1 illustrates a system for the online checking of system behavior against system and security policies.

For example, FIG. 1 depicts a log analyzer 12 of a security information and event management (SIEM) tool that 10 checks incoming system events generated by system components C1, C2, C3 . . . , which produce data and also typically interact with one another to produce further data. The events are checked in real time against system and security policies 14. In case of policy violations like the one of exceeding the threshold of failure events within a given time window, the log analyzer 12 triggers countermeasures, or indicates policy violations and/or pattern matches to a system administrator or system component 16 for triggering the countermeasures. These countermeasures can be predetermined based on the type of policy violation and/or pattern match, and therefore provided in real time and in an automated fashion.

In general, it is advantageous for data streams to be analyzed continuously and efficiently. In particular, it is advantageous for the elements of data streams to be processed in real time in the rate they are generated. Furthermore, irrespective of the application area, almost every data stream processing application requires some form of data aggregation, often the aggregation of data items within a sliding window. Cf also M. Stonebraker, U. Cetintemel, and S. Zdonik: "The 8 Requirements of Real-Time Stream Processing," SIGMOD Record 34(4), 2005. In this respect, the data aggregation in the simple example above is to continuously count the failure events within the given time window of 30 seconds.

Figure 2:
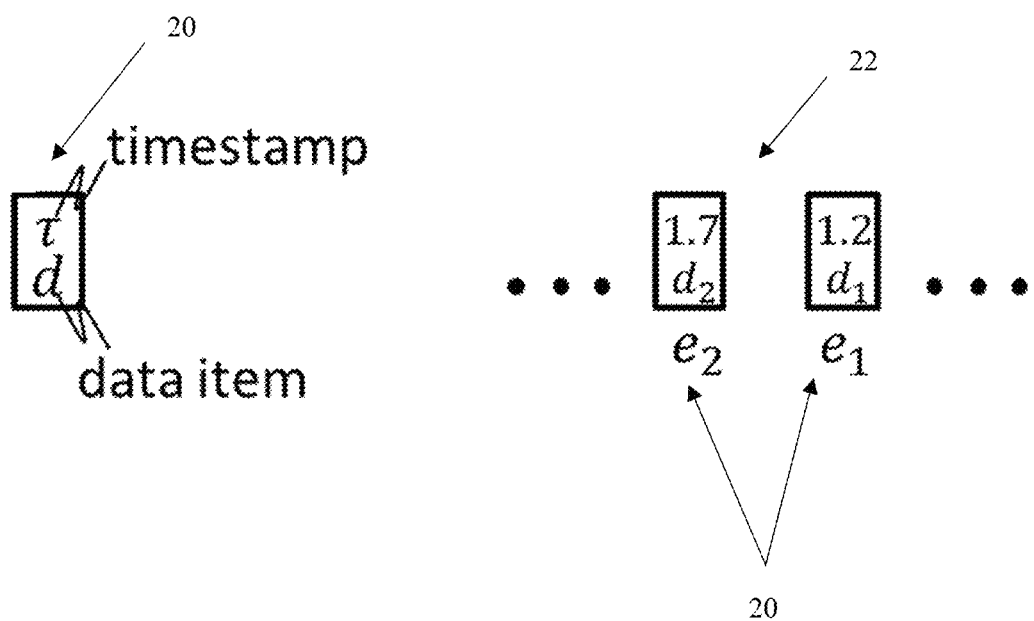
FIG. 2 illustrates element ordering of stream elements.

The efficient processing of data streams is further complicated by the fact that stream elements may not be necessarily received in the order they are generated. For illustration, FIG. 2 shows, on the left-hand side, the format of a stream element 20 including a timestamp r and data item d and, on the right-hand side, how a stream element $e_2$ can appears out-of-order within a data stream 22 of stream elements 20 as its timestamp of 1.7 is greater than the timestamp 1.2 of the later stream element $e_1$. Network delays and retransmissions of network packets are one reason that stream elements 20 may not be ordered linearly according to their timestamps in a data stream 22. Buffering and reordering the stream elements 20 delays the outcome of an analysis, thereby adversely affecting the latency of the output of the processed data stream. Furthermore, buffering and reordering may result in a huge memory and computational overhead, which can quickly become the bottleneck. Embodiments of the present invention overcome these problems by being able to efficiently process out-of-order data streams without having to buffer and reorder, thereby saving computational resources and memory, while reducing latency and providing for faster computational processing, and thus quicker implementations of actions and countermeasures.

For efficiency reasons, data streams can be processed in a pipeline, which is not necessarily linear since a pipeline stage can have multiple predecessor and successor stages. Each pipeline stage performs a certain operation on the stream elements and continuously produces output (i.e., another data stream), which is forwarded to a next pipeline stage. For illustrating this concept using the example depicted in FIG. 1, it is possible that the log analyzer 12 processes the stream of logged system events by the following pipeline: After receiving the stream elements they are first sanitized before the data items of the relevant stream elements are aggregated in a separate stage. Some stages in turn may be carried out in parallel. For instance, when the sanitization of one of the stream elements is computationally expensive (e.g., due to regular expression matching) and thereby presents a potential bottleneck for the pipeline, it is possible to implement this stage by several computation nodes that run in parallel, each sanitizing stream elements separately.

Figure 3:
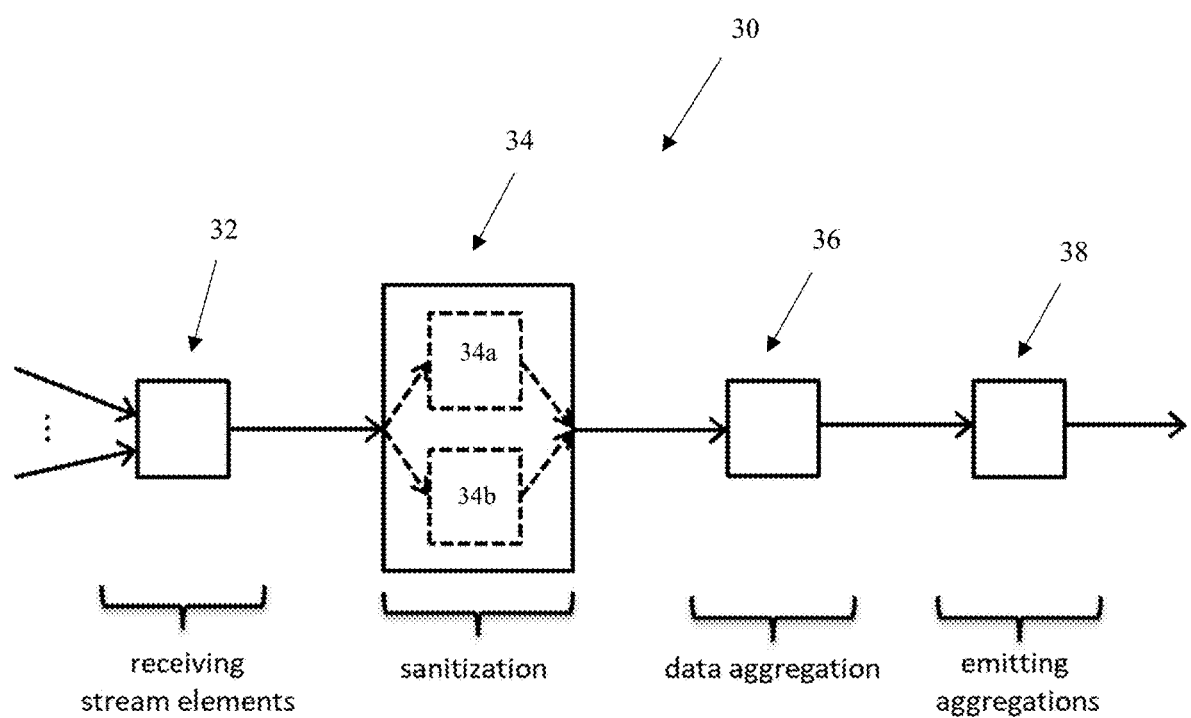
FIG. 3 illustrates a data stream processing pipeline.

For example, as illustrated in the exemplary pipeline 30 in FIG. 3 which receives stream elements at an input node 32, a sanitization stage 34 can straightforwardly be parallelized with multiple computation nodes 34a, 34b, since there are no dependencies between the stream elements (the sanitization is a stateless operation). While this allows the computation nodes 34a, 34b to carry out sanitization in parallel, carrying out a stage in parallel/concurrently is another reason why stream elements can become out-of-order. For example, the computation nodes 34a, 34b may have different loads and may run at different speeds and hence, the next stage may receive the stream elements in a different order. Providing buffering and reordering stages for the data elements from the sanitization stage 34 before a data aggregation stage 36 would be a potential bottleneck in the pipeline 30. After the data aggregation stage 36, the aggregations can be emitted by an output node 38.

Since embodiments of the present invention are able to efficiently process out-of-order data streams online, it is not only possible to avoid or reduce buffering and reordering stages, which result in the technical improvements to the computational systems described above, but also possible to carry process the data streams faster. In particular, embodiments of the present invention provide a framework for processing data streams in a pipeline in which stages may be carried out concurrently/in parallel since it is not necessary for the stream elements to remain ordered prior to aggregation, which can be performed over a sliding window according to embodiments of the present invention. Moreover, sorting and buffering can be avoided, which results in faster processing, reduced computational resources and memory and reduced latency for later processing stages.

In an embodiment, the present invention provides a method for processing an out-of-order data stream. A new data stream element is inserted into a segment list according to a timestamp of the new data stream element. It is identified whether there are missing data stream elements between segments in the segment list. The segments which have no missing data stream elements between them are merged. Values of the data stream elements are aggregated using a sliding window over out-of-order data stream elements in the merged segment.

In an embodiment, each of the segments includes a left-most sliding window and a right-most sliding window, wherein the values of the data stream elements are aggregated by moving the right-most sliding window of a first one of the segments to the right and computing data aggregations in each window until a left bound of the right-most sliding window of the first one of the segments matches with a left bound of the left-most sliding window of a second one of the segments, the second one of the segments spanning a time window that is later than the first one of the segments, and wherein the computed data aggregations for each of the windows are output.

In an embodiment, the method further comprises removing data stream elements between a right bound of the left-most sliding window of the first one of the segments and the left bound of the right-most sliding window of the second one of the segments.

In an embodiment, a plurality of pairs of segments are merged in parallel.

In an embodiment, the segment list is a skip list which stores partial data aggregations, the segments being ordered ascendingly by timestamps of their stream elements, and wherein the new data stream element is inserted into the skip list as a new singleton segment. In an embodiment, the skip list includes a plurality of buckets into which data stream elements of the data stream are insertable in parallel.

In an embodiment, the method further comprises inserting a gap element for an identified missing data stream element. In an embodiment, the gap element has meta-information which includes a timestamp of a singleton interval and a sequence number of the missing data element having the timestamp together with an end marker.

In an embodiment, the method further comprises annotating each data stream element of the data stream from a plurality of data producers with sequence numbers so as to provide a lexicographical ordering of the data stream elements.

In an embodiment, the method further comprises filtering some of the data stream elements out of the data stream and inserting gap elements annotated with the same sequence numbers as the data stream elements which were filtered out.

In an embodiment, the method further comprises inserting a gap element for an identified missing data stream element, the inserted gap element being annotated with meta-information including a timestamp of a time window of the segments, a data producer and a sequence number. In an embodiment, the data producer is a data producer of a first data stream element in the time window, and wherein the sequence number comprises two parts, a first part having a sequence number of the first data stream element and a second part having a counter value of a number of time windows that start at the timestamp.

In an embodiment, a tree is stored for each segment in the segment list, wherein the data stream elements of the segments are aggregated using an associative operator from left to right, and wherein the subtrees of the trees of the segments are reused during the aggregation.

In another embodiment, a system comprises one or more processors which, alone or in combination, are configured to provide for execution of the method for processing an out-of-order data stream according to any embodiment of the invention.

In a further embodiment, a tangible, non-transitory computer-readable medium has instructions thereon which, upon being executed by one or more processors, alone or in combination, provide for execution of the method for processing an out-of-order data stream according to any embodiment of the invention.

In the following, an underlying system model according to an embodiment of the present invention is first described. Before providing particular details of different embodiments of the present invention, the terminology is explained according to the following description.

Figure 4:
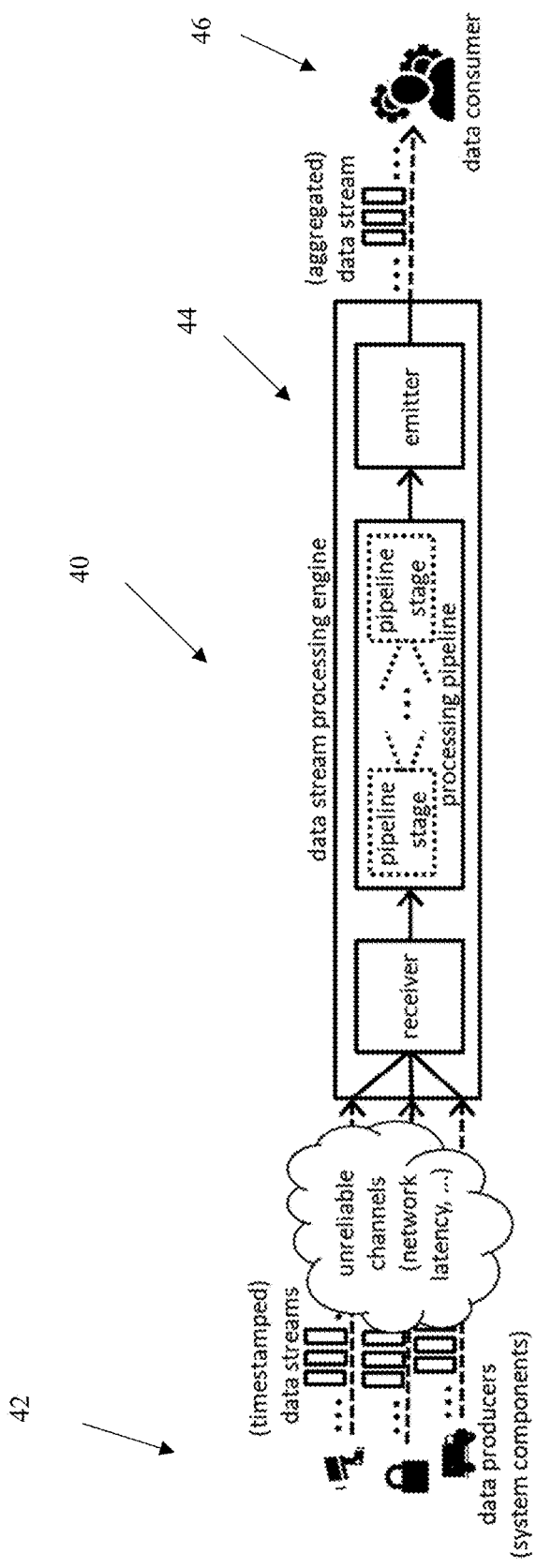
FIG. 4 illustrates a system and method for receiving, processing and outputting data streams.

FIG. 4 illustrates a data stream processing system 40. According to embodiments of the present invention, it is assumed that a system producing a data stream is composed of multiple components. These components could be, for example, software components of a cloud-based IT system or Internet-of-Things (IoT) devices or a mixture of both. Some of the system components produce data. Such a component is referred to herein as a data producer 42. For instance, an IoT sensor may measure the temperature every second, which it continuously sends to a platform 44, for example, comprising one or more servers or central processing units (CPUs) connected to memory which provide stages of a processing pipeline between a receiver node for the unprocessed data stream and an emitter node for the processed data stream. The platform 44 hosts a service for processing and analyzing the measurements from multiple components in the processing pipeline. Processing the data usually includes aggregations of some sort. The processed data, possibly aggregated, is again a data stream that is emitted to a data consumer 46, which may just collect the data, process it further, or may make decisions based on the processed data.

The examples given above and illustrated in FIGS. 1 and 3 can be reformulated to be an instance of this system model according to an embodiment of the present invention. In particular, the SIEM's log analyzer 12 is an instance of the data stream processing engine of the platform 44 and the data consumer 46, which likewise can be implemented in hardware, takes countermeasures like terminating or isolating a system component when the failure events exceed a given threshold, for example, in an automated manner in real time.

As used herein, a data stream a is a possibly infinite sequence $e_0$; $e_1$; $e_2$; . . . , where the $e_i$s are called stream elements. In practice, stream elements are often structured, e.g., JavaScript Object Notation (JSON) objects. Furthermore, they often contain meta-information like the element's producer or a timestamp when the element was generated. In the following, it is assumed that each stream element is timestamped. It is also assumed that the timestamps are linearly ordered and unique (i.e., there are no two stream elements with the same timestamp). First, note that for a single data producer, the uniqueness of timestamps is usually fulfilled in practice, since the data producer cannot generate multiple stream elements at the same time. When there are multiple data producers, the uniqueness of the timestamps can be achieved according to embodiments of the present invention by including additional information to a timestamp. For example, one can include the data producer, define a linear order over all data producers, and combine both orderings (i.e., the lexicographical combination orderings).

Data streams are usually given incrementally. In each iteration, the next stream element of the data stream is provided. However, as already discussed, the stream elements of a data stream σ might appear out-of-order. For instance, it can be the case that the timestamp of a stream element $e_i$ is larger than the timestamp of another stream element $e_j$ although the stream element $e_i$ appears in the data stream σ before the stream element $e_j$, i.e., i<j. If the elements appear in the order of their timestamps, it can be said that the data stream σ is ordered. Furthermore, the data stream σ can be referred to as incomplete if not all stream elements are contained in the data stream a; otherwise, the data stream σ can be referred to as complete. An ordered data stream can be incomplete. On the other hand, in a complete data stream, each stream element eventually appears. However, in general, it is not known how long it is necessary to wait until all stream elements with a timestamp smaller than a given upper bound have appeared. Analogously, in general, it cannot be inferred whether all stream elements between two given stream elements have already been received.

Data aggregation combines the data items of multiple stream elements. Typically, the combinations involve the data times of stream elements over some period of time. An example of a data aggregation is the number of failure events within 10 seconds, where the data stream consists of time-stamped, logged system events.

In the following, it is possible to refer to σ=$e_0$; $e_1$; $e_2$; . . . as an ordered and complete data stream that is complete and the stream elements are ordered by their timestamps. A time window I is a nonempty interval over the timestamps. The data aggregation (with respect to an operator op) over the time window I is defined as op ($e_i$, $e_{i+1}$, . . . , $e_{j-1}$, $e_j$), where i is the smallest index of a stream element with a timestamp in the time window I and j is the largest index of a stream element with a timestamp in the time window I. For ease of explanation, the notation used here is simplified to identify the data item of a stream element with its stream element. Finally, it is noted that, since the data stream σ is ordered and complete, the data aggregation over a time window [τ, κ] can be computed when receiving a stream element with a timestamp equal to or greater than κ.

The operator op is often defined as $op(e_i, e_{i+1}, \ldots, e_{j-1}, e_j) := e_i \otimes e_{i+1} \otimes \ldots \otimes e_{j-1} \otimes e_j$, where $\otimes: D \times D \to D$ is associative. When $(D, \otimes)$ is a monoid, then the "empty" data aggregation is also well defined, namely, op( ) is the monoid's neutral element. Instances of $\otimes$ are integer addition, string concatenation, set union, and matrix multiplication. Note that, since $\otimes$ is associative, it is irrelevant how the parentheses are placed in the term $e_i \otimes e_{i+1} \otimes \ldots \otimes e_{j-1} \otimes e_j$. However, the order of the elements matters when $\otimes$ is not commutative.

Figure 5:
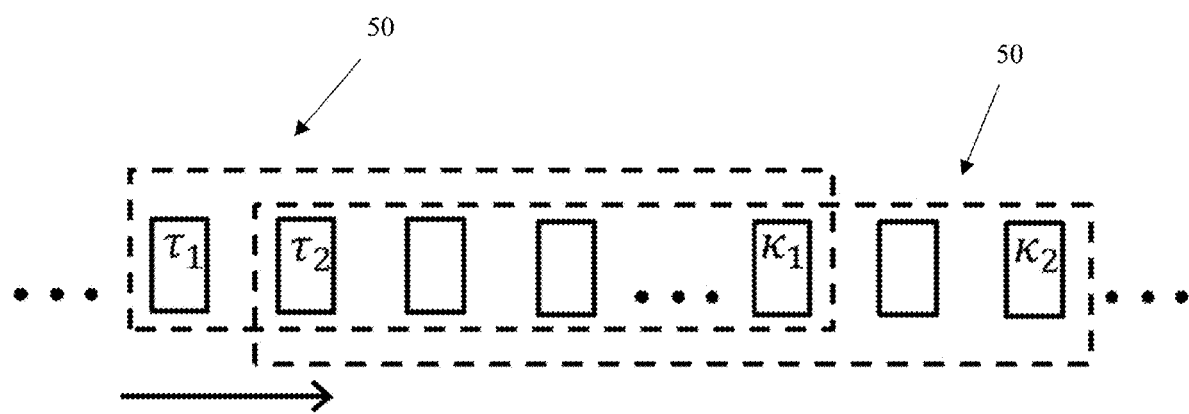
FIG. 5 illustrates a sliding window over an ordered and complete data stream.

Sliding windows are time windows that move together with a data stream. More formally, a sliding window is given through a sequence of pairwise distinct time windows $l_0; l_1; l_2; \ldots$, with $l_i = [\tau_i, \kappa_i]$, $\tau_i \leq \kappa_i$, $\tau_i \leq \tau_{i+1}$, and $\kappa_i \leq \kappa_{i+1}$, for all $i \geq 0$, as illustrated in FIG. 5. As exemplarily shown therein, time windows 50 always move to the right. Furthermore, the number of stream elements within different time windows 50 may differ. The time windows 50 can be specified by a duration (e.g., 10 seconds) or by dedicated start and end tags. The data aggregation over the sliding window $l_0; l_1; l_2; \ldots$ is the data stream that consists of the data elements of the time windows $l_j$ together with their data aggregations. The linear order on timestamps extends to a linear order on the time windows (lexicographic ordering). Hence, the stream elements of the obtained data stream are also timestamped.

Data aggregation over complete, out-of-order data streams can be analogously provided as in the case of data aggregation over complete, ordered data streams according to embodiments of the present invention. However, in contrast to the setting where stream elements are received ordered by their timestamps, the computation of the aggregation can either be (i) postponed until the delayed stream elements have also been received, (ii) approximated, or (iii) recomputed when new stream elements within the time window are received. Similarly, when the data stream is incomplete, it is possible to either not compute all aggregations or compute aggregations that approximate the missing data items.

Figure 6:
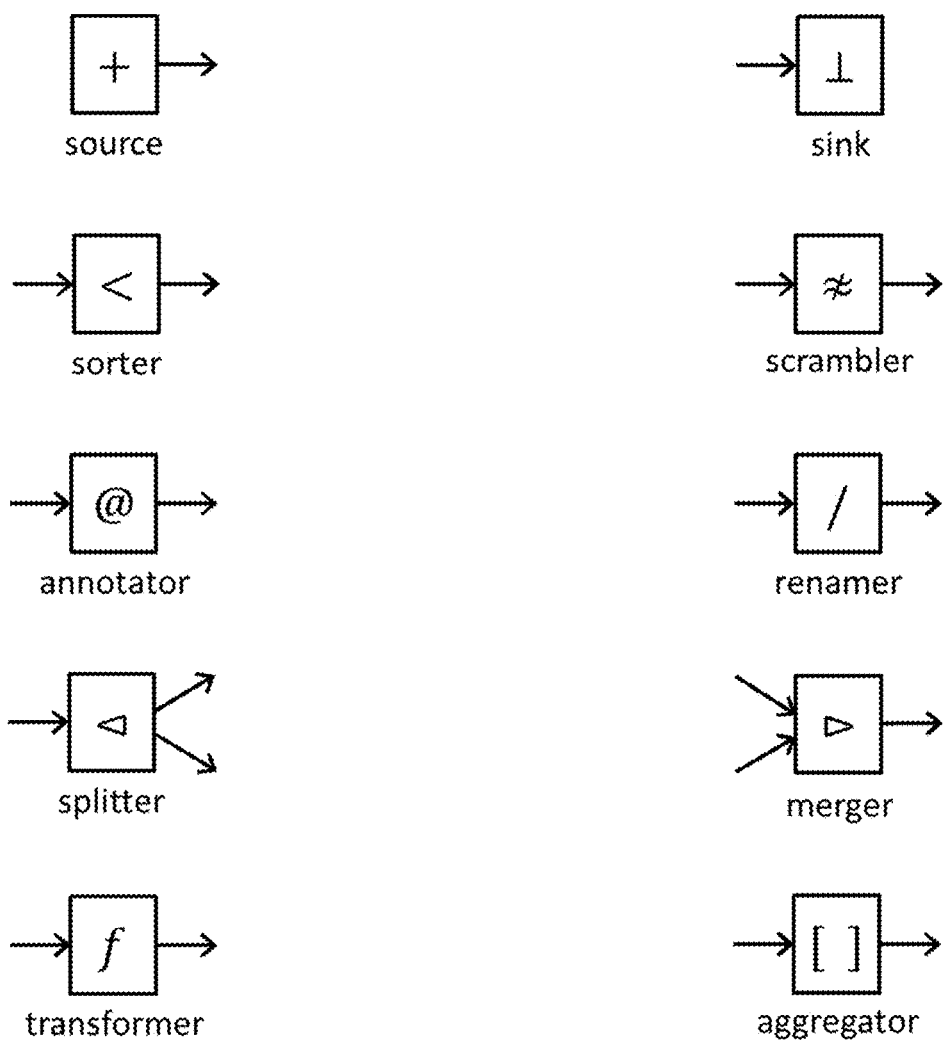
FIG. 6 illustrates core building blocks of a compositional framework to design and implement a stream processing pipeline according to an embodiment.

In the following, a compositional framework to design and implement a stream processing pipeline according to an embodiment of the present invention is described. The basic building blocks of the framework are shown in FIG. 6 and described in the following list:

Source: The node generates a data stream in which its elements are timestamped.

Sink: The node drops all stream elements. This node is also used for marking the end of processing a data stream and where elements are submitted somewhere else.

Sorter: The node buffers stream elements and outputs them ordered by their timestamps. The node requires the identification of neighboring stream elements, for example, using annotations of the stream and/or gap elements.

Scrambler: The node outputs the stream elements in any order. This node is used, e.g., to represent the network, which does guarantee to preserve the element ordering.

Annotator: The node annotates stream elements with a component and sequence numbers. The node assumes that the stream elements are ordered by their timestamps with no gaps between them.

Renamer: The node renames or removes a component and its sequence numbers from the stream elements.

Splitter: The node splits the data stream into substreams.

Merger: The node merges multiple data streams into a single data stream.

Transformer: The node applies a function to each stream element. The elements' data item is transformed.

Aggregator: The node aggregates the data items of the stream elements over a sliding window. The node requires the identification of neighboring stream elements.

Each of the foregoing nodes of FIG. 6 can be implemented in the cloud, for example, by processors or cloud servers configured by software to perform the respective operations. Likewise, the different nodes could be implemented using one or more CPUs using a scheduler to provide computational time/resources to the respective operations of the different nodes. Further, the nodes could be separate computers or virtual machines.

Figure 7:
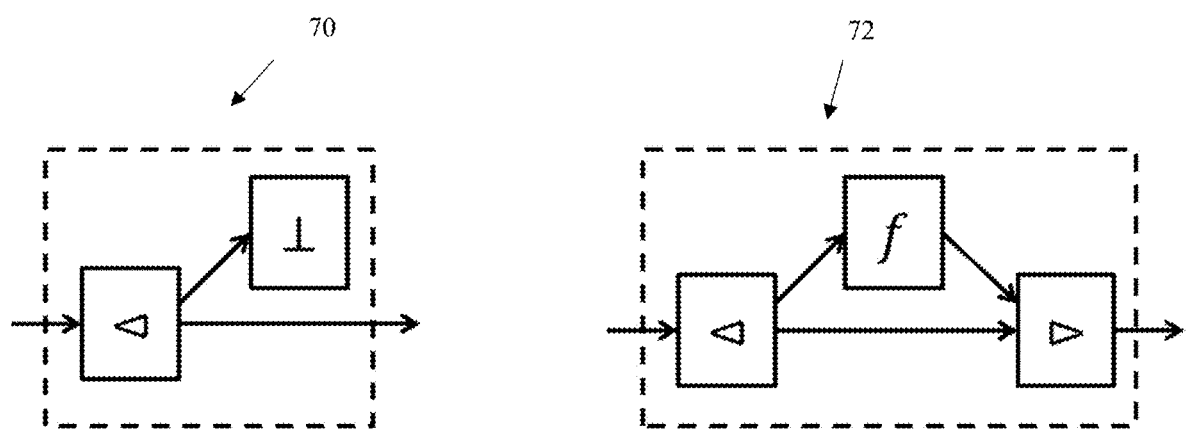
FIG. 7 illustrates examples of a filter and a conditional transformer.

FIG. 7 provides two examples for obtaining more complex pipeline stages from combining the core building blocks. Namely, the left-hand side shows a filter stage 70 that filters out certain data stream elements and the right-hand side shows a conditional transformer stage 72, i.e., a transformer that is only applied to some stream elements. In both examples, a splitter node decides for a given condition where to forward a received stream element. The filter 70 can send some data elements to a sink node depending on the presence of the condition. The filter 70 can result in an incomplete data stream and the conditional transformer 72 can produce an out-of-order stream, depending on its implementation. If the splitter node, the transformer node, and the merger node run concurrently in the conditional transformer, then there is no guarantee that the incoming order of the stream elements is preserved. In contrast, if each incoming stream element is processed separately, the ordering of the stream elements is preserved.

Figure 8:
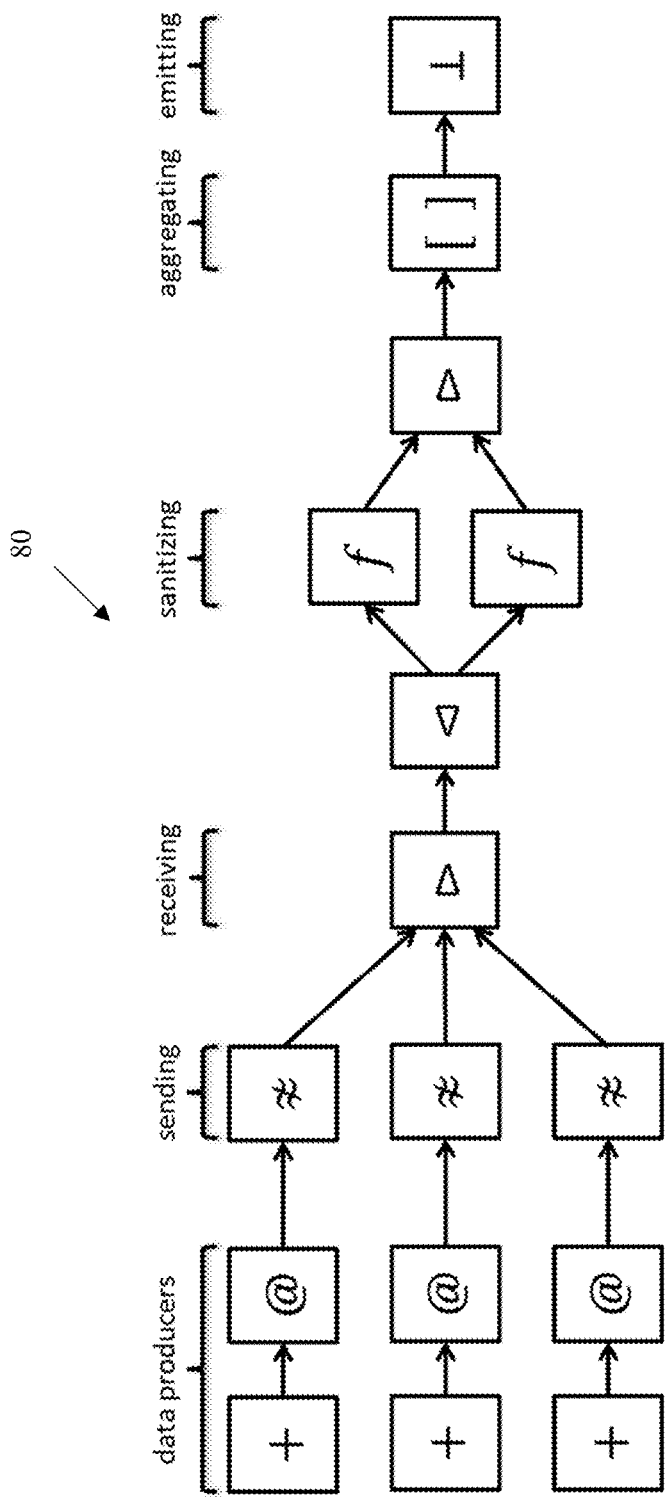
FIG. 8 illustrates an example stream processing pipeline.

FIG. 8 illustrates an example data processing pipeline 80 which uses the framework's core building blocks from FIG. 6, for example, to build a pipeline such as that shown in FIG. 3, which also includes the data producers as separate stages. The reason for their inclusion is to make the data producers' guarantees on the data stream explicit. Namely, it is assumed that their substreams are complete and ordered, and their stream elements are annotated. Annotations can be used to infer whether two stream elements are direct neighbors as discussed in further detail below. The stages for the sending and the receiving of stream elements are also included to the pipeline. Both stages may result in out-of-order data streams. From these observations, it is inferred that the aggregation stage must handle out-of-order data streams. If, however, the implementation of the aggregation stage does not meet this requirement, it is necessary to add a sorting stage before the aggregation stage. Adding a sorting stage directly after the receiving stage would be pointless, since the sanitization stage is carried out by two nodes that run in parallel and the merging of the two substreams may produce an out-of-order data stream. Thus, in order to be effective, the sorting state must be placed directly in front of the aggregating stage. According to an embodiment of the present invention, a sorting stage is not necessary since any gaps can be accounted for in the aggregation stage, and aggregation can occur on out-of-order data streams. This improves the computation of the data stream since sorting is requires buffering and high computer processing power, and also causes latency to later stages of the processing pipeline. Depending on the implementation of the sending stage (in particular, the protocol used for transmitting data), it can be assumed that the data stream is complete for the aggregation stage. For example, transmission control protocol/internet protocol (TCP/IP) guarantees that no stream elements are lost; in contrast, stream elements can be lost when using user datagram protocol (UDP).

As already discussed above, and discussed further below, embodiments of the present invention allow for the aggregating of out-of-order data streams and/or with gaps such that a sorting stage is not necessary. As shown in the example data processing pipeline 80, the data producer stage can, for each data producer, include a source node followed by an annotator node which, for example, can provide for the ability to provide serial numbering for all the data elements from the data producers. The sending stage can include a scrambler node for each of the data producers which direct their output to a receiving stage having a merger node to merge the respective data streams. Changing the order of ordered events is usually not desirable. However, when, for example, sending events from one destination to another destination, it cannot guarantee that the event order is preserved. There are multiple reasons for this: network packets might take different routes, network latency, etc. The scrambler node in this example corresponds to the transmission of the events and provides that events can be arbitrarily reordered. The loss of event ordering in many situations is not desirable, but cannot be avoided. Accordingly, the scrambler node in this example can be seen as symbolizing the physical transmission over the internet from one computer to another computer where event can become unordered.

In the following, a method to efficiently aggregate data in a sliding window over an out-of-order data stream according to an embodiment of the present invention is described. In particular, an efficient implementation for the "aggregator" core building block in FIG. 6 is provided, under the assumption that the received data stream is out of order. The following description begins with a high level description before providing particular details of embodiments of the present invention.

The proposed method according to embodiments of the present invention maintains a list of segments. Each segment contains stream elements, ordered ascendingly by the elements' timestamps, with no gaps between them. Two data structures are maintained within each segment. These data structures correspond to pointers to the left-most and right-most sliding window within the segment's stream elements. The reason for keeping the two sliding windows is that some intermediate results of the aggregated data may be reused later as discussed in further detail below. As discussed above, the sliding windows are time windows that move together (in increasing timestamps) with a data stream. The window corresponds to a functional requirement for data aggregation that is pre-specified. For example, such a requirement could be to compute the number of failed login attempts of a given user within a five minute interval. This translates to a sliding window of a five minute width.

The left-most sliding window contains the first elements of the segment and the right-most window contains the last elements of the segment. If no window fits entirely within a segment, then no windows are created.

Within each sliding window, data is partially aggregated. Then, the window is shifted to the right, entirely meeting the right-most window (or until a gap is reached). For example, one possible method to aggregate data would be to rely on a tree structure. In this case, whenever the sliding window is shifted to the right, the tree of the partial computations is updated with the data of the next segment (e.g., using the algorithm described in D. Basin, F. Klaedtke, and E. Zali-nescu, "Greedily computing associative aggregations on sliding windows," Information Processing Letters (IPL), 115(2):186-192 (2015), which is hereby incorporated herein in its entirety).

When a new element arrives, it is placed in a singleton segment. Then, the right-most sliding window of the previous segment can be shifted to the right, if possible, to include the newly inserted element.

According to an embodiment of the present invention, skip lists are used (see, e.g., W. Pugh: "Skip Lists: A Probabilistic Alternative to Balanced Trees," Communications of the ACM 33(6), (1990), which is hereby incorporated herein in its entirety), as the underlying data structure. An advantage of using skip lists over lists is that skip lists have better complexity bounds. For instance, the average complexity of inserting a node is logarithmic in the length of the skip list. In contrast, for lists, the complexity is linear in the length of the list.

Alternatively to skip lists, other embodiments of the present invention use self-balancing search trees like AVL-tress, red-black trees, or B-trees. Some operations on skip lists are simpler to describe and to implement (for example, the merging of nodes) than their counterparts for self-balancing search trees. Furthermore, on the one hand, skip lists have also the advantage that no rebalancing steps are necessary. On the other hand, most self-balancing search trees have the advantage that most operations (lookup, insertion, deletion) have the amortized worst case complexity $O(\log n)$ whereas for skip lists the average complexity is $O(\log n)$, but the worst case complexity for degenerated cases, which are very unlikely, is $O(n)$.

Figure 9:
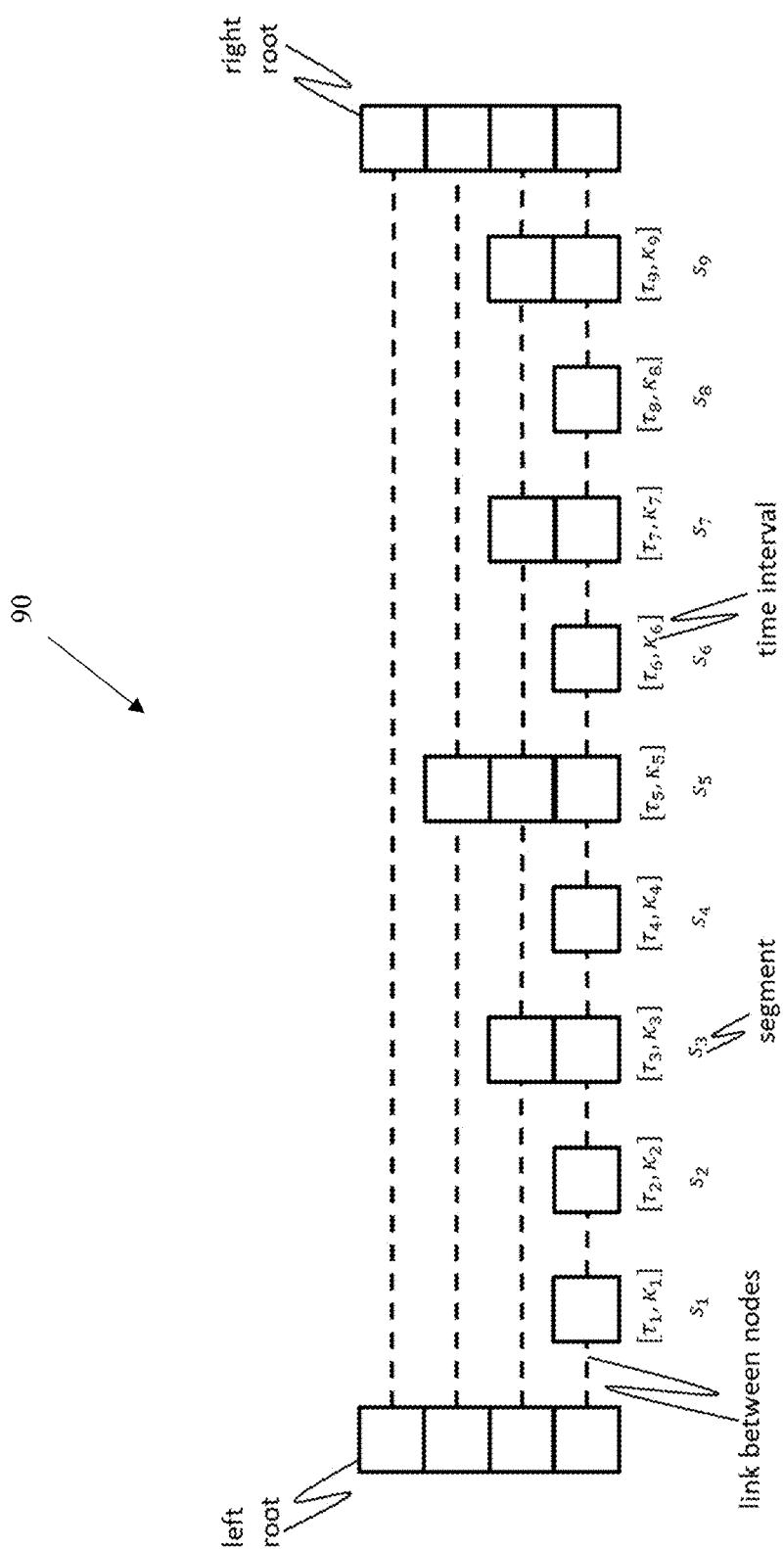
FIG. 9 illustrates a skip list for data aggregations on out-of-order data streams.

As shown in FIG. 9, the elements in a skip list 90, which are also referred to herein as segments, store partial aggregations. The segments $s_1$-$s_9$ are ordered ascendingly by the timestamps of the stream elements.

According to an embodiment of the present invention, a newly received stream element is processed in accordance with the following steps:

1. The new element is inserted in the skip list 90 as a new singleton segment, according to the element's timestamp.

2. Starting from the new singleton segment, adjacent segments are merged if there is no gap between them (i.e., no missing stream elements between the respective left and right frontiers of the adjacent segments).

3. The resulting merged segment is updated. This includes the computation of partial data aggregations and the output of data aggregations over the sliding window. There can be no or multiple outputs. For each window, a value is computed and output. When two segments are merged, it can be the case that the merged segment does not contain a new window. Thus, in this case, there will be no output when merging the two segments. It can also be the case that the merged segment contains several new windows. For each of these windows, the output is computed as the data aggregation of the respective window. It is noted that the sliding window does not always have to be moved by one element to the right in all embodiments. Rather, the steps of the window can be by multiple elements, or fractions thereof, or could be time-based such that each step of sliding the window can cover different amounts of data elements.

Step 1 is self-explanatory. Before providing further details on step 2 and step 3, the components of a segment in addition to the interval $[\tau, \kappa]$ it covers are described. The segment contains a list of stream elements, ordered ascendingly by the elements' timestamps. Furthermore, the elements are contained in some partial sliding window within the segment. Furthermore, the list includes the stream elements contained in the left-most (complete) sliding window and in the right-most (complete) sliding window. In addition, the segment has markers for these two sliding windows. If no complete sliding window is contained in the segment, then the markers are nil. The two complete sliding windows may overlap, as is the case in FIG. 10. The reason for keeping the two complete sliding windows is that some intermediate results of the aggregated data may be reused (see below).

If there is an upper bound on the maximal delay of stream elements, adjacent segments are merged, whenever the delay is exceeded between the right frontier and the left frontier of the respective adjacent segments. Alternatively, if there is no maximal delay or the maximal delay is not known, the stream elements' annotations can be used to infer whether there is no gap between two given stream elements. In the setting where the stream elements originate from a single data producer with sequence numbers, it can easily be inferred whether there are no missing stream elements between two given stream elements: There is no gap if and only if the elements' sequence numbers are i and i+1. This generalizes to multiple data producers, where each data producer maintains a counter and annotates its stream elements with sequence numbers, which are provided by the counter (see also D. Basin, F. Klaedtke, and E. Zalinescu, "Runtime verification over out-of-order Streams" ACM Transactions on Computational Logic (TOCL), 21(1):5 (2019), which is hereby incorporated by reference herein in its entirety, in particular section 7.2.1). Other alternatives like dedicated stream elements for closing gaps between segments are possible, e.g., so-called low watermarks (see T. Akidau, A. Balikov, K. Bekiroglu, S. Chernyak, J. Haberman, R. Lax, S. McVeety, D. Mills, P. Nordstrom, and S. Whittle, "MillWheel: Fault-tolerant stream processing at internet scale," Proceedings of the VLDB Endowment 6(11) (2013), which is hereby incorporated by reference herein in its entirety). The different alternatives can also be combined.

Figure 11:
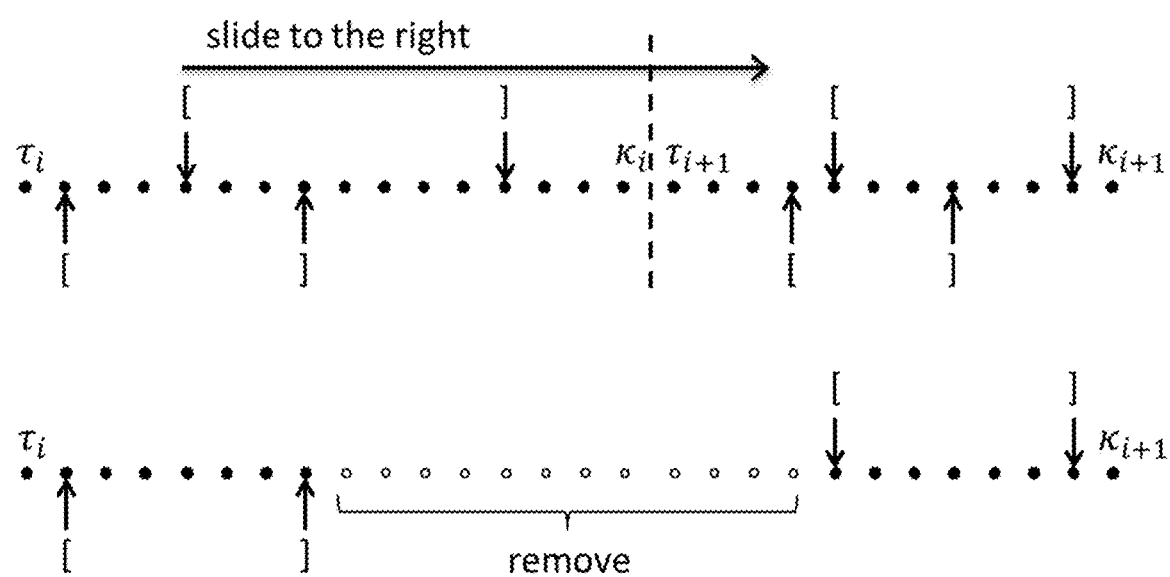
FIG. 11 illustrates merging of segments.

For example, the two adjacent segments $s_i$ and $s_{i+1}$ are merged in step 2. The resulting segment t (see top of FIG. 11) is as described in the following, provided that the markers of the sliding windows of $s_i$ and $s_{i+1}$ are not nil. Note that t covers the smallest interval that contains the union of the intervals that the segments $s_i$ and $s_{i+1}$ cover. The left-most sliding window of t is the left-most sliding window of $s_i$ and the right-most sliding window oft is the right-most sliding window of $s_{i+1}$. The data aggregations for the sliding window within the segment t and t's list are obtained as follows (see also FIG. 11).

1. The list of the segment $s_{i+1}$ is appended to the list of the segment $s_i$.
2. The right-most sliding window of $s_i$ is moved to right and the data aggregations of the new complete sliding windows are computed until the left bound of the right-most sliding window of $s_i$ matches with the left bound of the left-most sliding window of $s_{i+1}$. It is also possible to compute the data aggregations in parallel by starting from the right-most window of $s_i$ (by sliding to the right) and also from the left-most sliding window of $s_{i+1}$ (by sliding to the left). Furthermore, when merging more than two segments, it is possible to compute the data aggregations of each two adjacent segments in parallel. The data aggregations are made by adding together the stream elements as the window moves to the right. How the window moves is different according to different embodiments and can be application dependent. For example, the window could move element-by-element or each time by ten elements to the right. It is also possible, for example, to move right bound of the window to the element before the element with a timestamp that starts a new minute. In this case, the number of elements that are contained in the window is not fixed.
3. The stream elements strictly between the left-most and right-most sliding windows (see hollow dots at the bottom of FIG. 11) of the merged segment t are removed from t's list since these elements will never be part of a window following the computation of the data aggregations for all windows during the sliding of the window from the left to the right.

The corner cases in which the sliding windows of at least one of the segments $s_i$ or $s_{i+1}$ are nil are variations of the above case. Namely, it is started with left-most stream element as a bound for the sliding window or it is stopped when sliding the right-bound of the sliding window over the right-most stream element.

In the following, two optimizations are described for aggregating the data items of the received stream elements more efficiently in certain cases. The first one concerns the skip lists and the second one provides the data aggregation when merging segments.

With respect to an optimization of an embodiment of the present invention using skip lists, it is noted that in practice, it is often the case that new stream elements are either added near the front or near the back of the skip list. To account for this practical relevant case, skip-list-based data structure is refined according to an embodiment of the present invention. In particular, the skip list is split into preferably three skip lists F, B, and M: The skip list F consists of the segments that belong to the front, the skip list B list consists of the segments that belong to the back, and the skip list M consists of the middle segments, which are updated less frequently as fewer stream elements are inserted into this skip list. These skip lists are referred to herein as buckets. If one of the buckets contains too many or too few segments (in comparison to the other buckets), the buckets are rebalanced, e.g., by stealing segments from one of the other skip lists (front or back). This optimization of splitting the skip list into three buckets offers similar advantages as the use of B-trees with fingers as described in K. Tangwongsan, M. Hirzel, and S. Schneider, "Optimal and general out-of-order sliding-window aggregation," Proceedings of the VLDB Endowment (PVLDB), 12(10):1167-1180 (2019), which is hereby incorporated by reference herein in its entirety, and presents a sub-O(log n) algorithm for data aggregation in out-of-order data streams. However, there are various parameters that can be fine-tuned easily when using skip lists. The rebalancing of the buckets F, B, and M may vary between applications or data streams. Several heuristics can be implemented when the rebalancing should take place. Furthermore, rebalancing skip lists is easier than rebalancing trees, which may propagate all the way up to the tree's root. The splitting of the buckets can be generalized. Instead of three skip lists, the skip list can be split into m≥1 buckets. For example, if stream elements are more likely to be inserted in the middle part, the M bucket can be split further. It is possible to insert elements in different buckets in parallel. For merging segments, it is provided, however, to look at the adjacent segments, which may be in a different bucket. Appropriate locks can be used when merging segments from different segments.

With respect to an optimization of an embodiment of the present invention for providing for the data aggregation when merging segments, the data aggregation is done by combining the stream elements in a sliding window by an associative operator ⊗ from left to right. The data aggregation of the stream elements $e_i, e_{i+1}, \ldots, e_{i+n}$ in a sliding window can be represented as a term, which in turn corresponds to a tree. Neither the term nor the tree is unique. Results of subterms or subtrees may be reusable for later data aggregations. The sliding window algorithm presented in Section 2 of D. Basin, F. Klaedtke, and E. Zalinescu, "Greedily computing associative aggregations on sliding windows," Information Processing Letters (IPL), 115(2): 186-192 (2015) is based on this setup for ordered data streams. This algorithm can be extended to out-of-order data streams according to an embodiment of the present invention. In addition to the left-most and the right-most sliding window in a segment, a segment also stores their corresponding trees for computing the data aggregations. When merging two segments, the sliding algorithm is started from the tree for the right-most sliding window of the left segment. To this end, the initialization step of the algorithm is adapted so that the maximal subtrees from this tree within the next sliding window are reused. Furthermore, when the sliding window overlaps with the left-most sliding window of the right segment, the largest possible subtrees of that respective tree are reused. These subtrees need to be determined at the beginning and whenever moving the sliding window to the right.

Figure 12:
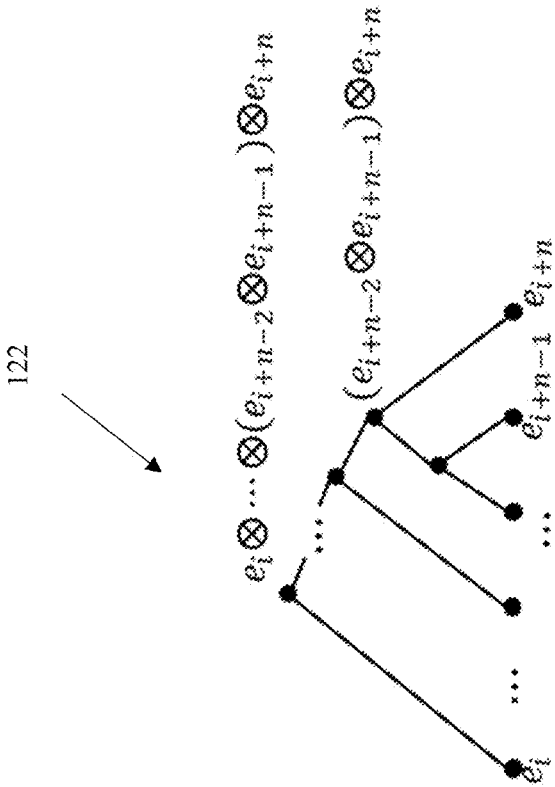
FIG. 12 illustrates a tree construction for reusable sub-trees.
Figure 12:
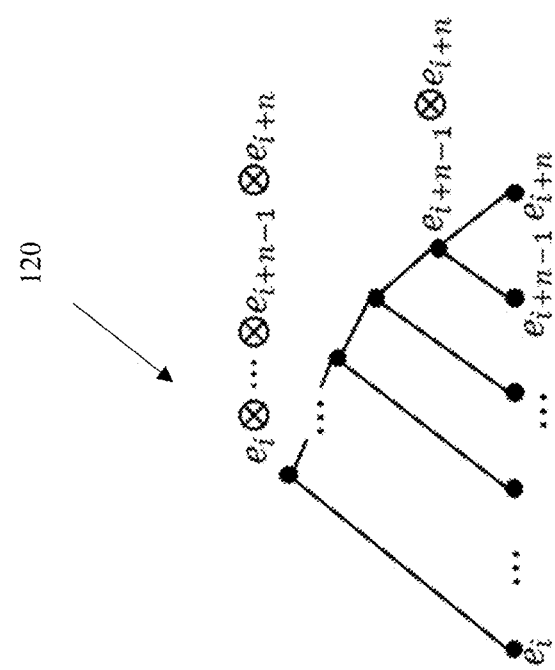

The tree construction is optimized in the case when it is known whether a stream element is never (or very unlikely) the first element of a time window. In particular, it is possible to apply the following heuristic to increase the "reusable" subtrees (i.e., the intermediate results of the data aggregations). As an example, assume that both markers in a segment $s_k$ are nil. Furthermore, assume that the left-most sliding window of the segment $s_k$ comprises the stream elements $e_i, e_{i+1}, \ldots, e_{i+n}$. For these elements, the data aggregation is computed as $e_i \otimes e_{i+1} \otimes \ldots \otimes e_{i+n}$, which the sliding-window algorithm from Section 2 of D. Basin, F. Klaedtke, and E. Zalinescu, "Greedily computing associative aggregations on sliding windows," Information Processing Letters (IPL), 115(2):186-192 (2015) computes from right to left by constructing the tree 120 shown on the left-hand side of FIG. 12. The reason for the right-to-left construction for this initial tree is that it maximizes the reusable subtrees when shifting the sliding window to the right. However, since prefixes of $e_i, e_{i+1}, \ldots, e_{i+n}$ can also be at the right frontier of a time window (when merging the segment $s_k$ with the segment on its left, i.e., the segment $s_{k-1}$), it can be beneficial to combine elements from left to right. For instance, when it is known that the stream element $e_{i+n-1}$ is never the first element of a time window, then the tree 122 on the right-hand side in FIG. 12 would allow to reuse the subtree for $e_{i+n-2} \otimes e_{i+n-1}$ when $e_{i+n-1}$ is the last element and $e_{i+n-2}$ the second to last element of a time window, which is not possible for the tree 120 on the left-hand side of FIG. 12. The general heuristic is to combine stream elements "leftwards" and not "rightwards" when it is known (or very unlikely) that they are never the first element of a time window. How to combine elements can depend on how the window is moved to the right. If the window always by one element and the window contains always two or more elements, an element will always be combined leftwards and rightwards. However, if the window is always moved to the next element with a timestamp that starts a new second and covers a minute, then an element with a timestamp with a fractional part of 500 milliseconds is very unlikely to be at the beginning of a window. In contrast, an element with a timestamp with a fractional part of 1 millisecond, is fairly likely at the beginning of a window. This also depends how the events' timestamps are distributed.

For operators that fulfill additional conditions, it is possible to compute the aggregations even more efficiently. For instance, if each element also has a matching inverse element, shifting the sliding window by one position to the right, the aggregation of the shifted sliding window can be computed by $e_i^{-1} \otimes d \otimes e_{i+n+1}$, where d is the aggregation for the sliding window consisting of the elements $e_i, e_{i+1}, \ldots, e_{i+n}$, i.e., $d = e_i \otimes e_{i+1} \otimes \ldots \otimes e_{i+n}$.

Figure 13:
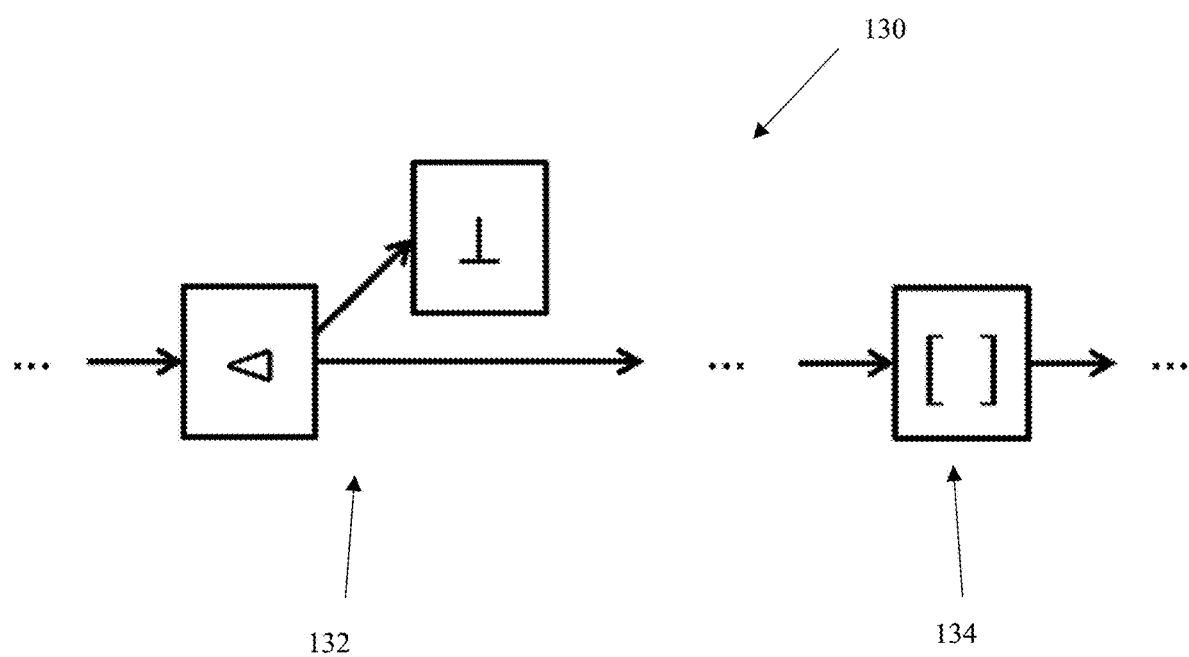
FIG. 13 illustrates a stream processing pipeline with filtering and data aggregation stages.

For some pipelining stages, it may be beneficial to insert extra elements that carry additional information for identifying gaps/no gaps. Assume a data processing pipeline 130 as depicted in FIG. 13 that has a filter stage 132 which filters stream elements and a later data aggregation stage 134 which performs some data aggregation over the non-filtered stream elements. The filtering by the filter stage 132 may result in a data stream for which the data aggregation stage 134 may not anymore infer that there is no gap between two received stream elements.

One option is to sort the data stream directly before the filtering stage. Furthermore, directly after the filter stage 132, the non-filtered stream elements can be annotated by new sequence numbers. However, this is a costly operation in terms of computational resources and memory, and would most likely cause a bottleneck of the whole pipeline. Furthermore, it would also increase the latency of the filter stage 132. Alternatively, the filter stage 132 may introduce gap elements that allow the later data aggregation stage 134 to infer whether there is a gap between two stream elements. Even adding gap elements with the same meta-information (e.g., timestamp, producer, and sequence number) as the dropped stream elements is usually more efficient and cost-effective than sorting the data stream. Notably, gap stream elements can be identified quickly. Furthermore, gap elements can be filtered out, when they are not needed anymore in later stages.

One way to identify gaps is using annotations and sequence numbers. Another way to identify gaps would be to identify, based on past processing, the number of stream elements which should be obtained per unit time, and to use a counter and determine if there are any differences. If so, a gap can be inferred. Additionally, it may be expected that certain data producers produce a stream element regularly such that gaps may be identified by timestamps showing that a measurement or data item may be missing.

As an optimization to reduce the number of stream elements, the filter stage 132 can collect meta-information from the filtered stream elements and add gap elements using the collected meta-information. For example, when filtering out ten consecutive stream elements from the same producer, the filtering stage could introduce a single gap element that informs the later aggregation stage that those ten stream elements were filtered out.

A related problem occurs when splitting a data stream in non-disjoint data streams and merging them again later on. To ensure that a stream element is uniquely identified by its meta-information, an embodiment of the present invention uses the renamer core building block shown in FIG. 6 and described above.

A data aggregation stage over a sliding window combines the data items from several consecutive stream elements. When the incoming data stream is ordered, the data aggregation stage can maintain a counter and attach to each computed data aggregation the corresponding meta-information. In particular, where the aggregated data stream is ordered, the counter provides the sequence number for each data aggregation. If, however, the incoming data stream is out-of-order, it may not be possible for later stages to infer whether there are no missing data elements between two given data elements of the aggregated data stream. The reasons for this are that (1) the sliding window might be shifted by more than one position to the right, and (2) the left position of the sliding window might not be shifted at all, i.e., the sliding window is enlarged to the right.

The following embodiment uses meta-information of the incoming data elements for later pipelining stages to infer whether there are no missing data elements between two data elements of the aggregated data stream. For each aggregated data element spanning over [τ, κ], the following meta-information is attached:

The timestamp is the time window [τ, κ] of the aggregated data. A timestamp is specified for the start and for the end of the time window. Usually, timestamps are clock values consisting of day and time and these are totally ordered. However, according to an embodiment of the present invention, the domain of timestamps is changed. In particular, timestamps are intervals of the form [τ, κ]. These enriched timestamps can again be ordered. A time window of these enriched timestamps is of the form [[τ, κ], [τ', κ']].

The data producer is the identifier for the aggregation stage together with the data producer of the first data element within the time window of the aggregated data. In particular, data is aggregated in aggregator nodes (see FIG. 6). The data producer of the aggregated value includes the identifier of the node that computed the aggregation.

The sequence number is composed of two parts:
1. the sequence number of the first data element of the time window, and
2. a counter value c, where c counts the number of time windows that start at time τ plus an endmarker, when the data aggregation is the last aggregation of a time window that starts at time τ.

Similar to the filtering stage above, the data aggregation stage adds gap stream elements for this stage when shifting the sliding window by more than one position to the right. The meta-information of a gap element is a special case of the meta-information for an aggregated data element of the time window [τ, κ]. In particular, the timestamp is the singleton interval {τ} and the sequence number is the sequence number of the "skipped" data element with timestamp T together with the endmarker. These gap elements can be distinguished from aggregated data elements over a singleton interval, since their sequence number does not include a counter value.

In other words, according to an embodiment of the present invention, a first aggregator outputs for each window an aggregation. Since the aggregator can receive the elements in any order, the aggregations are not necessarily ordered. For instance, the aggregation for the window [1, 2] may be output after the aggregation for the window [6, 10]. In the case that a later pipeline stage would aggregate data based on these previously aggregated values, it would be advantageous for such a later aggregator to be able to identify whether there is a gap between two received aggregated values. To this end, the first aggregator inserts the gap elements (dummy elements) discussed above with the described timestamps and sequence numbers.

The new timestamps are also linearly ordered by extending the timestamp ordering of the incoming data stream lexicographically. Furthermore, the linear and discrete ordering of the sequence numbers for each component within the incoming data stream extends to a linear and discrete ordering with a least element, or the smallest element according to the ordering. For example, zero is the least element over the natural numbers, which are ordered by <. With this meta-information at hand, the same approach as in Section 7.2.1 of D. Basin, F. Klaedtke, and E. Zalinescu, "Runtime verification over out-of-order Streams" ACM Transactions on Computational Logic (TOCL), 21(1):5 (2019) can be used to identify gaps at later pipeline stages.

Embodiments of the present invention provide for one or more of the following improvements and advantages 1) Grouping received stream elements with no gaps between them into segments and maintaining two data structures (right-most and left-most sliding window) per segment to ensure an efficient data aggregation process. This also allows to reuse intermediate data aggregation results when possible.

Advantage 1: For a newly received (out-of-order) stream element, its neighboring, already-received stream elements can be determined more efficiently. In other words, inserting stream elements into the data structure for data aggregation is faster. This results in more efficient data stream processing, saving computational resources and memory and/or allowing for faster processing.

Advantage 2: Efficient data aggregation in a sliding window over an out-of-order data stream, in particular, when the combination of data items (by the given associative operator) is costly. Thus, this approach, compared to known approaches saves computational resources and memory, and reduces latency of later processing pipeline stages.

2) Adding gap stream elements (e.g., dummy elements) to identify gaps between stream elements.

Advantage: The added gap stream elements can make it unnecessary to buffer and sort an out-of-order data stream before aggregating the stream elements' data. As discussed above sorting and buffering are computationally costly and burdensome, and causes latency. The added gap elements also allow to parallelize pipeline stages. Gap elements can be processed quickly in a pipeline stage without causing latency to later pipeline stages and therefore allow for significant improvements over solutions based on buffering and sorting stream elements. Gap stream elements are also different from low watermarks. In particular, low watermarks are based on heuristics that no late stream elements will arrive with a smaller timestamp than the low watermark.

3) Adjusting meta-information of stream elements (in particular, their sequence numbers) for a later pipelining stage. For example, it is possible to include a producer id of data aggregation and extend sequence numbers with sliding window counters.

Advantage: Similar to improvement 2) by providing for more efficient stream processing using the meta-information 4) Providing the composition of core building blocks for processing out-of-order data streams in a pipeline.

Advantage: Designing and implementing a pipeline is easier and more efficient using these core building blocks. For example, potential bottlenecks are easier to identify. Likewise, assumptions on the pipeline stages are easier to identify and verify, in particular, assumptions on the ordering of stream elements. Additionally, the core building blocks are well-defined and can be implemented separately to optimize the pipeline and its respective stages.

5) Avoiding sorting of stream elements as a potential bottleneck.

Advantage: Computational resource and memory savings, reduced latency and faster processing.

6) Reusing at least some partial data aggregations when possible. This is especially advantageous to reduce computational cost when the operator for data aggregation is computationally complex, such as matrix multiplication.

Advantage: Computational resource and memory savings, reduced latency and faster processing 7) Computing actual data aggregations, as opposed to approximating data aggregations.

Advantage: Increased accuracy.

Figure 10:
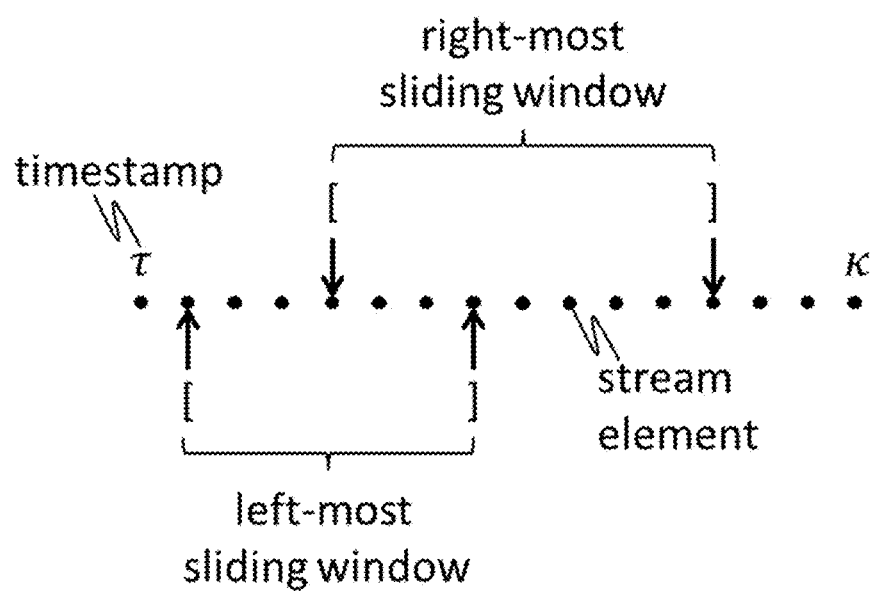
FIG. 10 illustrates a segment with its components.

In an embodiment, the present invention provides a method for out-of-order data aggregation comprising:

1) Inserting a newly received stream element according to its timestamp into a segment list.
2) Identifying gaps between adjacent segments in the segment list.
3) Merging adjacent segments with no missing stream elements:

Initializing the left-most and right-most sliding window of left segment (if they do not exit). Referring to FIG. 10, the pointers for the left-most window and the right-most window are shown. However, there is a special case: "small" segments do not include yet any window. In this case, the pointers are nil. In this case, segments are merged in which these pointers are nil, they could remain nil (if there is still no window within the merged segment) or they must be initialized (if there are windows that are now contained in the merged segment).

Computing (partial) data aggregations of the merged segments, and outputting their data aggregations. The data aggregation is preferably done starting from the right-most sliding window of the left segment to the left-most sliding window of the right window.

Updating the left-most and right-most sliding window of the merged segment.

Removing irrelevant stream elements from the merged segment between the updated sliding windows.

If a later pipeline stage assumes complete data streams, this data aggregation may also insert gap stream elements, for example in the step of merging the segments when outputting the data aggregations, and adjust the stream elements' meta-information so that the later stage can infer whether there is a gap between two stream elements. Other pipelining stages may use the same procedure, e.g., when splitting a data stream into multiple streams.

In another embodiment, the present invention provides a method for data stream processing pipeline implementation comprising:

1) Designing the pipeline, in particular, using the core building blocks of the framework shown in FIG. 6.
2) Analyzing the pipeline design. In particular, potential bottlenecks (buffering and sorting where possible) are removed and/or stages are parallelized where possible. Also, the assumptions on the pipelining stages are identified and it is checked if the assumptions are met or correct.
3) Implementing the pipeline, in particular, implementing the different stages with their data operations from the analyzed and optimized pipeline design, and linking the stages to each other. It can then be ensured that the implementation of each data operation meets the respective identified assumptions from the analyzed pipeline design.

Embodiments of the present invention to improve the efficiency and security of IoT platforms and security operations centers which analyze data streams.

In the following, pattern matching over out-of-order streams is discussed. Such pattern matching can used in embodiment of the present invention, such as those described above. Features described below can be combined with features described above in different embodiments. Reference is also made to U.S. Patent Application Publication No. 2019/0215340. Algorithms are presented to correctly reason about system behavior in real time even when receiving system events in an order different from the events' occurrence. The presented online algorithms promptly output the matches of patterns in out-of-order streams, where the patterns are either given as finite-state automata or formulas of a linear-time temporal logic. At the algorithms' core is a novel data structure for storing and combining intermediate matching results. Findings of an experimental evaluation of prototypes that implement the presented algorithms are also reported.

Contributions provided by the following discussion are the online algorithms for pattern matching and LTL trace checking over out-of-order streams. Both are based on transition profiles that store intermediate results of received stream elements. Prototype implementations of the algorithms are also presented, together with an experimental evaluation.

First, standard notation and terminology used throughout the following discussion are introduced.

Standard terminology and notions from automata theory are used in the following discussion. In particular, $\varepsilon$ denotes the empty word, $\Sigma^*$ the set of all words over the alphabet $\Sigma$, and $u \cdot v$ the concatenation of the words u and v. For brevity, it is sometimes just written as uv for $u \cdot v$. A nondeterministic finite-state automaton (NFA) $\mathcal{A}$ is a tuple $(Q, \Sigma, q_0, \delta, F)$, where Q is a finite set of states, $\Sigma$ an alphabet, $q_0 \in Q$ the initial state, $\delta: Q \times \Sigma \to 2^Q$ the transition function, and $F \subseteq Q$ the set of accepting states. The NFA $\mathcal{A}$ is deterministic if $|\delta(q,a)| \leq 1$, for every $q \in Q$ and $a \in \Sigma$. In this case, the acronym DFA is used. The function $\hat{\delta}: Q \times \Sigma^* \to 2^Q$ is inductively defined for $q \in Q$: $\hat{S}(q, \varepsilon) := \{q\}$ and $\hat{S}(q, au) := \cup_{q' \in \delta(q,a)} \hat{\delta}(q', u)$, for $a \in \Sigma$ and $u \in \Sigma^*$. The language of $\mathcal{A}$ is $L(\mathcal{A}) := \{w \in \Sigma^* | \hat{\delta}(q_0, w) \cap F \neq \emptyset\}$.

Boolean matrices are used to reason about an automaton's behavior. Let $\mathcal{A} = (Q, \Sigma, q_0, \delta, F)$ be an NFA with $Q = \{0, \ldots, n\}$. For each $a \in \Sigma$, it is provided to associate the Boolean $|Q| \times |Q|$ matrix $M_a^\delta$ defined as:

$$M_a^\delta[p, q] := \begin{cases} 1 & \text{if } q \in \delta(p, q), \\ 0 & \text{otherwise.} \end{cases}$$

Furthermore, define $M_\varepsilon^\delta := U$ and $M_{au}^\delta := M_a^\delta \cdot M_u^\delta$, for $a \in \Sigma$ and $u \in \Sigma^*$, where U denotes the unit $|Q| \times Q$ matrix (i.e., $U[p, p] = 1$ and $U[p, q] = 0$ for $p \neq q$) and · denotes Boolean matrix multiplication. Note that · is associative on square matrices. Finally, for $L \subseteq \Sigma^*$, define $M_L^\delta := \Sigma_{w \in L} M_w^\delta$.

Example 1: As a running example in the following discussion, the DFA is considered over the alphabet $\{a, b, c\}$ depicted in FIG. 14A. It accepts the words that end with the letter a and do not contain the letter c. The boxes in FIG. 14B correspond to the matrices (the matrices' superscript with the DFA's transition function are omitted). $M_a$, $M_b$, and $M_c$. A box's left border lists the source states and the right border lists the target states. There is a dashed line from a source state p to a target state q iff M[p, q]=1, where M is the box's corresponding matrix. FIG. 14C shows the boxes for the multiplication $M_a \cdot M_b = M_{ab} = M_b$ and the matrix $M_{\Sigma^*}$.

The following lemma, which is straightforward to prove by induction, links reachability in $\mathcal{A}$ to Boolean |Q|×Q matrices.

Lemma 2: Let p, q∈Q. For w∈Σ* it follows that:

$$q \in \hat{\delta}(p, w) \text{ if } M_w^\delta[p,q]=1$$

Moreover, for L⊆Σ*, it is the case that q∈$\hat{\delta}$(p, w), for some w∈L iff $M_L^\delta$[p, q]=1. Let M be the set of all Boolean |Q|×|Q| matrices. Note that (M, ·, U) is a monoid with the submonoid ($M^\delta$, ·, U), where $M^\delta$ is the subset of M that contains the matrices U and $M_a^\delta$, for a∈Σ, and is closed under ·.

Streams are modelled as (infinite) timed words, that is, a stream over the alphabet Σ is an infinite sequence ($\tau_0$, $a_0$) ($\tau_1$, $a_1$) . . . , where the $\tau_i$s are timestamps and $a_i$∈Σ, for all i∈ℕ. It is assumed that the timestamps are elements of $\mathbb{Q}_{\geq 0}$ and require that they are strictly increasing (i.e., $\tau_i < \tau_j$, for every i, j∈ℕ with i<j) and nonzeno (i.e., for every κ∈$\mathbb{Q}_{\geq 0}$, there is some j∈ℕ with $\tau_j$>κ).

The elements of a stream are received iteratively. Its elements may however be received out of order; some may not even be received at all. The order of the received ones can be restored by the elements' timestamps. The following definition allows us to describe snapshots of the received stream elements.

Definition 3

Let Σ be an alphabet with □∉Σ. The set of observations Obs(Σ) is inductively defined.

The word ([0, ∞), □) is in Obs(Σ).

If the word w is in Obs(Σ) then the word obtained by one of the following transformations to w is also in Obs(Σ).

Transformation (T1): Some letter (I, □) of w is replaced by the three-letter word:

$$(I \cap [0,\tau), \square)(\{\tau\}, a)(I \cap (\tau, \infty), \square),$$

where τ∈I, τ>0, and a∈Σ. For τ=0 with τ∈I, the letter (I, □) is replaced by the two-letter word: ({τ}, a)(I∩(τ, ∞), □).

Transformation (T2): Some letter (I, □) of w, with I bounded, is replaced by the empty word.

The letters of the form ({τ}, a) in w∈Obs(Σ) are the received stream elements (τ, a). Gaps between stream elements are made explicit in w by the letters of the form (I, □) with |I|>1. Note that w's last letter is always of the form (I, □), where I is unbounded. This corresponds to the fact that the stream elements' timestamps are non-zero. When receiving a new stream element one of the gaps in w is split by the transformation (T1), which also inserts the newly received element.

The transformation (T2) removes gaps. Note that the removal of gaps assumes that one can identify whether there are no missing stream elements between two received stream elements. When elements are never lost, one can close gaps either (a) after enough time has elapsed or (b) by so-called low watermark messages. Note that both (a) and (b) are based on heuristics that over-approximate an element's maximal delay and ignore elements with timestamps within closed gaps. Alternatively, gaps can be identified by attaching additional information to the elements, namely, the producer of an element with the element's sequence number. Furthermore, note that gaps are treated uniformly to simplify matters, i.e., □ acts as a placeholder for any number of stream elements. It is also possible to introduce additional letters to differentiate between different kinds of gaps. For instance, $\square_{[0,k]}$ could represent a gap of at most k>0 elements. However, this would require that to obtain such additional information about the not-yet-received elements. A gap's interval I constraints the timestamps of the possible missing stream elements. With an additional transformation, which is omitted to simplify matters, it is possible to shrink a gap's interval. This may be reasonable when receiving a live message from system components in addition to stream elements.

In the remainder of the following discussion, let Σ be an alphabet, with □∉Σ. Furthermore, the following additional notation is used.

Definition 4

(i) Sub (Σ) is the set of all subwords of words in Obs (Σ).
(ii) Ext(w)⊆Σ* is the set of all possible extensions of w∈Sub(Σ), that is, a letter of the form (J, b) with b∈Σ in w is replaced by b and a letter of the form (J, □) is replaced by some word in Σ*.
(iii) The restriction of w∈Sub(Σ) to the interval I⊆$\mathbb{Q}_{\geq 0}$, denoted by $w_{\uparrow I}$, is w's largest subword consisting of the letters (J, b) with b∈Σ∪{□} and I∩J≠∅.

Transition Profiles. To reason about an automaton's behavior over out-of-order streams, Boolean matrices (cf. Lemma 2 above) are equipped with additional information (this extension is also called "transition profiles"). Before defining transition profiles in Definitions 6 and 8 below, the following example provides some intuition with respect to their connection to NFAs.

Figure 15:
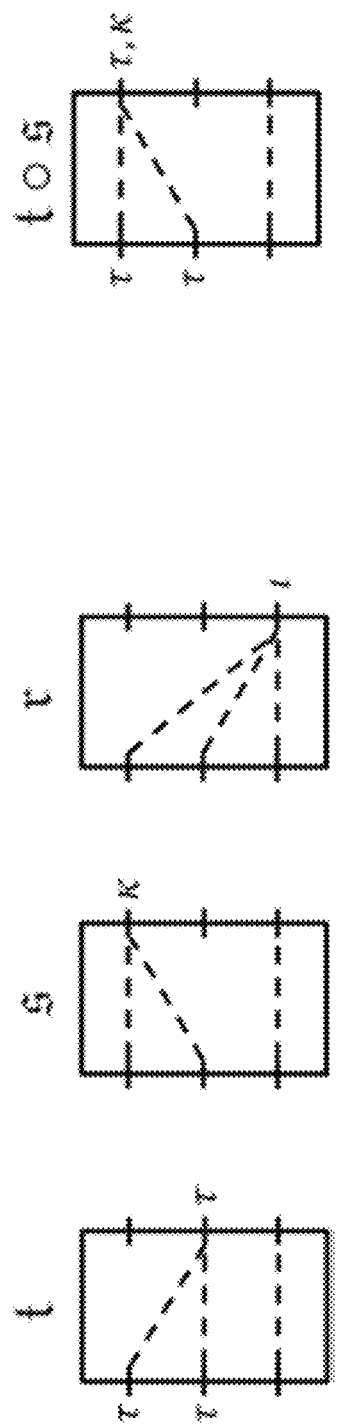
FIG. 15 shows transition profiles.

Example 5: The DFA is revisited with its Boolean matrices from Example 1. FIG. 15 shows the transition profiles t, s, and r for the stream elements (τ, a), (κ, b), and (ι, c), respectively. The boxes correspond to the matrices $M_a$, $M_b$, and $M_c$ already shown in FIG. 14B. FIG. 15 also shows on the right the combined transition profile t · s, which corresponds to (τ, a)(κ, b), assuming τ<κ.

A box's target and source states are annotated by timestamps of the stream elements. The annotations keep track of (1) the states that are reachable by a nonempty suffix from the initial state and (2) the states from which a nonempty prefix reaches an accepting state. For instance, for the combined transition profile, the target state 0 is annotated with r, since it is reached from the initial state 0 when reading the word ab. The target state 0 is also annotated with κ, since it is reached from the initial state 0 when reading the suffix b. Analogously, the source states 0 and 1 are both annotated with τ since the accepting state 1 is reached by both of them when reading the prefix a. Note that no source state is annotated with κ, since there is no state that reaches the accepting state 1 with ab.

Definition 6

Let Q={0, . . . , n}, for some n∈ℕ.
T is the set of transition profiles of size |Q|, i.e., the triples (f, M, g) with M∈M and f, g:Q→$2^{\mathbb{Q}_{\geq 0}}$. Recall that M is the set of Boolean |Q|×|Q| matrices.
The operation · over T is defined as:

$$(f, M, g) \cdot (f', M', g') := (f'', M \cdot M', g'')$$

With f"(q)=f(q)∪U{f'(p)|M [p, q]=1, for some p∈Q} and g" (q)=g' (q)∪U{g(p)|M' [q, p]=1, for some p∈Q}, for q∈Q.

The size of transition profiles and also matrices is omitted when clear from the context or irrelevant to simplify terminology. Furthermore, for t=(f, M, g), it is written that t[p, q] for M [p, q], $\vec{t}$ for the function g, and $\overleftarrow{t}$ for the function $f$.

In particular, for q∈Q, $\vec{t}$(q) and $\overleftarrow{t}$(q) denote the sets g(q) and η(q) of timestamps, respectively. Also, $f$ is called the backward annotation of t and g is forward annotation. Finally, u denotes the transition profile with u[q, q]=1 and u[p, q]=0 and $\vec{u}$(q)=$\overleftarrow{u}$(q)=∅, for p, q∈Q with p≠q.

As expected, (T, ·, u) is a monoid, as shown by the following lemma.

Lemma 7: (T, ·, u) is a monoid.

Proof of Lemma 7. It is shown that T is closed under · and · is associative with neutral element u. In the remainder of the proof, t, $\mathfrak{s}$, r range over elements in T and let q∈Q. Obviously, t· $\mathfrak{s}$∈T. It is shown next that t·u=t. The case u·t=t is symmetric and omitted. Since u's matrix is the unit matrix, the matrices of t·u and t are identical. For the backward annotations: $\overleftarrow{t \circ u}$(q)=$\overleftarrow{t}$(q), since $\overleftarrow{u}$(p)=∅, for every p∈Q. For the forward annotations: ($\overrightarrow{t \circ u}$)(q)=∩{t(p)|u[q, p]=1 for some p∈Q}, since $\vec{u}$(q)=∅. Since u[q, p]=1 only for p=q, it can be concluded that ($\overrightarrow{t \circ u}$)(q)=t(q).

It remains to show that t·($\mathfrak{s}$·r)=(t· $\mathfrak{s}$)·r. Since matrix multiplication on square matrices is associative, the matrices of t·($\mathfrak{s}$·r) and (t· $\mathfrak{s}$)·r are identical. For the backward annotations, it holds that:

$$(\overleftarrow{t \circ (\mathfrak{s} \circ r)})(q) = \overleftarrow{t}(q) \cup \left\{(\overleftarrow{\mathfrak{s} \circ r})(p) \,\Big|\, t[p, q] = 1, \text{ for some } p \in Q\right\} =$$

$$\overleftarrow{t}(q) \cup \overleftarrow{\mathfrak{s}}(p) \cup \{\overleftarrow{r}(p') \mid s[p', p] = 1, \text{ for some } p' \in Q\} \mid$$

$$t[p, q] = 1, \text{ for some } p \in Q\} =$$

$$\overleftarrow{t}(q) \cup \left\{\overleftarrow{\mathfrak{s}}(p) \,\Big|\, t[p, q] = 1, \text{ for some } p \in Q\right\} \cup$$

$$\left\{\overleftarrow{r}(p') \mid s[p', p] = t[p, q] = 1, \text{ for some } p', p \in Q\right\}$$

The proof for the forward annotations is symmetric and omitted.

In the following, the connection NFAs and Boolean matrices are carried over. In particular, Lemma 9 below extends Lemma 2 to transition profiles. Let $\mathcal{A}$=(Q, Σ, q₀, δ, F) be an NFA with Q={0, . . . , n}, for some n∈ℕ. Similar to M^δ, T^δ is defined as the subset of T that is closed under · and contains the transition profiles u and t with t[p, q]=M_a^δ[p, q], and $\vec{t}$(q) and $\overleftarrow{t}$(q) are finite sets, for all a∈Σ and p, q∈Q. Recall that for a∈Σ, M_a^δ∈M^δ denotes the Boolean |Q|×|Q| matrix as defined in Section 2. Obviously, (T^δ, ·, u) is a submonoid of (T, ·, u). Furthermore, (M^δ, ·, U) is isomorphic to a submonoid in (T^δ, ·, u).

Definition 8

(i) The transition profile $\mathfrak{g}^{\mathcal{A}}$ is defined as $\mathfrak{g}^{\mathcal{A}}$:=(h, M, h), with M=M_{Σ*}^δ and h(q)=∅, for q∈Q.

For τ∈ℚ_{≥0} and a∈Σ, the transition profile $t_{τ,a}^{\mathcal{A}}$ is defined as $t_{τ,a}^{\mathcal{A}}$:=(f, M, g), with M=M_a^δ and f, g: Q→$2^{\mathbb{Q}_{\geq 0}}$ are as follows for q∈Q.

$$f(q) = \begin{cases} \{\tau\} & \text{if } M_a^\delta[q, p] = 1, \text{ for some } p \in P \\ \emptyset & \text{otherwise} \end{cases}$$

$$g(q) = \begin{cases} \{\tau\} & \text{if } M_a^\delta[q_0, q] = 1 \\ \emptyset & \text{otherwise} \end{cases}$$

For w∈Sub(Σ), the transition profile $t_w^{\mathcal{A}}$ is defined as follows.

$$t_w^{\mathcal{A}} := \begin{cases} u & \text{if } w = \varepsilon \\ \mathfrak{g}^{\mathcal{A}} \circ t_{w'}^{\mathcal{A}}, & \text{if } w = (I, \square)w', \text{ for some } w' \in Sub(\Sigma) \\ t_{\tau,a}^{\mathcal{A}} \circ t_{w'}^{\mathcal{A}}, & \text{if } w = (\{\tau\}, a)w', \text{ for some } w' \in Sub(\Sigma) \end{cases}$$

where $t_w^{\mathcal{A}}$'s matrix only depends on $\mathcal{A}$'s transition function δ, whereas the functions $\overleftarrow{t}_w^{\mathcal{A}}$ and $\overrightarrow{t}_w^{\mathcal{A}}$ depend also on $\mathcal{A}$'s accepting states F and $\mathcal{A}$'s initial state q₀, respectively.

Lemma 9:

Let w∈Sub(Σ), p, q∈Q, and τ∈ℚ_{≥0}.

(a) $t_w^{\mathcal{A}}$[p, q]=1 iff q∈$\hat{δ}$(p, u), for some u∈Ext(w).

(b) τ∈$\overrightarrow{t}_w^{\mathcal{A}}$(q) iff τ is a timestamp in one of w's letters and q∈$\hat{δ}$(q₀, u), for some u∈Ext($^w↾_{[τ,∞)}$).

(c) τ∈$\overleftarrow{t}_w^{\mathcal{A}}$(q) iff τ is a timestamp in one of w's letters and $\hat{δ}$(q, u)∩F≠∅, for some u∈Ext($^w↾_{[τ,∞)}$).

This part of the discussion ends with Lemma 11 below, which shows that transition profiles provide a means to reason about the acceptance of certain words by an automaton. In particular, for given transition profiles $t_u^{\mathcal{A}}$ and $t_v^{\mathcal{A}}$, it can be inferred whether the NFA $\mathcal{A}$ accepts subwords in Ext(uv) that start in u and end in v.

Proof of Lemma 9: (a) follows from Lemma 2. To prove (b), this is done by an induction over w's length. (c) is proven analogously. The base case |w|=0 trivially holds. Note that $t_w^{\mathcal{A}}$=u in this case. For the step case, a case split is made on w's last letter. Recall that 0 is associative by Lemma 7.

Case w=w' (I, □), with w'∈Sub(Σ) and the interval I⊆ℚ_{≥0}. Since $t_w^{\mathcal{A}}·\mathfrak{g}^{\mathcal{A}}=t_w^{\mathcal{A}}$ and $\vec{\mathfrak{g}}^{\mathcal{A}}$(q)=∅, it is the case that τ∈$\overrightarrow{t}_w^{\mathcal{A}}$(q) iff τ∈∪{$\overrightarrow{t}_{w'}^{\mathcal{A}}$(p)|$\mathfrak{g}^{\mathcal{A}}$[q, p]=1, for some p∈Q}, that is, there is some p∈Q with τ∈$\overrightarrow{t}_{w'}^{\mathcal{A}}$(p) and $\mathfrak{g}^{\mathcal{A}}$[q, p]=1. By the induction hypothesis, τ∈$\overrightarrow{t}_{w'}^{\mathcal{A}}$(p) iff τ is a timestamp in one of w''s letters and p∈$\hat{δ}$(q₀, u'), for some u'∈Ext(w'↾_{[τ,∞)}). Furthermore, from (a), it follows that $\mathfrak{g}^{\mathcal{A}}$[q, p]=1 iff q∈$\hat{δ}$(p, u), for some u∈Σ*. Thus, uu'∈Ext($^w↾_{[τ,∞)}$).

Case w=w'({k}, a), with w'∈Sub(Σ), k≠τ, and a∈Σ. Since $t_{w'}^{\mathcal{A}} · t_{k,a}^{\mathcal{A}} = t_w^{\mathcal{A}}$ and τ∉$\overrightarrow{t}_{k,a}^{\mathcal{A}}$(q)=∅, it is that τ∈$\overrightarrow{t}_w^{\mathcal{A}}$(q) iff τ∈∪{$\overrightarrow{t}_{w'}^{\mathcal{A}}$(p)|t[q, p]=1, for some p∈Q}. Similar as in the previous case, it is concluded that this is equivalent to that τ is a timestamp in one of w's letters and q∈$\hat{δ}$(q₀, u), for some u∈Ext($^w↾_{[τ,∞)}$).

Case w=w'({τ}, a), with w'∈Sub(Σ) and a∈τ. Since $t_w^{\mathcal{A}} · t_{τ,a}^{\mathcal{A}} = t_w^{\mathcal{A}}$, it is the case that τ∈$\overrightarrow{t}_w^{\mathcal{A}}$(q)iff]≠∈$t_{τ,a}^{\mathcal{A}}$(q)∪∪{$\overrightarrow{t}_w^{\mathcal{A}}$(p)|$t_{τ,a}^{\mathcal{A}}$[q, p]=1, for some p∈Q}. Since the timestamps are ordered in w, it follows from the induction hypothesis that τ∈$\overrightarrow{t}_{τ,a}^{\mathcal{A}}$(q) iff τ∈$\overrightarrow{t}_w^{\mathcal{A}}$(q), which in turn is equivalent to that τ is a timestamp in one of w's letters and q∈$\hat{δ}$(q₀, u), for some u∈Ext($^w↾_{[τ,∞)}$).

Definition 10

Let t and $\mathfrak{s}$ be transition profiles.

(i) The outer match set of t is the set (∪_{q∈F} $\vec{t}$(q))×$\overleftarrow{t}$(q₀).

(ii) The inner match set between t and ŝ is the set $\cup_{q \in Q}$ ($\vec{t}$(q)× $\overleftarrow{s}$(q)).

Lemma 11:

For the transition profiles $t_u^{\mathcal{A}}$ and $t_v^{\mathcal{A}}$, with u, v∈Sub(Σ), let O be the outer match set of $t_u^{\mathcal{A}}$ and I the inner match set between $t_u^{\mathcal{A}}$ and $t_v^{\mathcal{A}}$, respectively.

(i) Provided that τ and τ' are the timestamps of u's first and last letter, $$(\tau, \tau') \in O \text{ iff } \bigcup_{w \in Ext(u)} \hat{\delta}(q_0, w) \cap F \neq \emptyset$$

(ii) Provided that uv∈Sub(Σ), $$(\tau, \tau') \in I \text{ iff } \bigcup_{w \in Ext(uv_{\upharpoonright[\tau, \tau']})} \hat{\delta}(q_0, w) \cap F \neq \emptyset$$

for all timestamps τ and τ' of some letter in u and v, respectively.

Proof of Lemma 11: To first prove (i), by definition, (τ, τ')∈O iff τ∈ $\vec{t}_u^{\mathcal{A}}$(q) and τ'∈ $\overleftarrow{t}_u^{\mathcal{A}}$($q_0$), for some q∈F. By Lemma 9(b) and (c), this is equivalent to q∈$\hat{\delta}$($q_0$, $w_1$) and $\hat{\delta}$($q_0$, $w_2$)∩F≠∅, for some $w_1$, $w_2$∈Ext(u) and q∈F. Note that τ and τ' are the timestamps of u's first and last letter. The equivalent statement is obtained that $\cup_{w \in Ext(u)}\hat{\delta}$($q_0$,u)∩F≠∅.

Next, to prove (ii, by definition, (τ,τ)∈I iff τ∈ $\vec{t}_u^{\mathcal{A}}$(q) and τ'∈ $\overleftarrow{t}_v^{\mathcal{A}}$(q), for some q∈Q. By Lemma 9(b) and (c), this is equivalent to q∈$\hat{\delta}$($q_0$, $w_1$) and $\hat{\delta}$(q, $w_2$)∩F≠∅, for some $w_1$∈Ext( $u_{\upharpoonright[\tau\infty}$) and $w_1$∈Ext( $v_{\upharpoonright[0,\tau']}$), where τ is a timestamp of one of u's letters and τ' is a timestamp of one of v's letters. Since $w_1 w_2$∈Ext( $uv$)$_{\upharpoonright[\tau,\tau)}$, the equivalent statement $\cup_{w \in Ext(( uv)_{\upharpoonright[\tau,\tau])}}\hat{\delta}$($q_0$, w)∩F≠∅ is obtained.

In the following, an online pattern-matching algorithm is described. It receives stream elements iteratively, possibly out of order, and outputs matches promptly.

Input and Output. Throughout this section, let σ=($\tau_0$, $a_0$)($\tau_1$, $a_1$) . . . be a stream over Σ and r: ℕ > ℕ an injective function. The function r, which defines the order in which σ's elements are received, is not part of the algorithm's input; the algorithm only iteratively receives elements of σ. Namely, the algorithm receives ($\tau_{r(\ell-1)}$, $a_{r(\ell-1)}$) at the beginning of its $\ell$ th iteration.

The pattern is given through a pair (J, $\mathcal{A}$), where J⊆ℚ$_{\geq 0}$ is an interval and $\mathcal{A}$ an NFA with ε∉L($\mathcal{A}$). In iteration $\ell$=1, 2, . . . , the algorithm outputs timestamp pairs ($\tau_i$, $\tau_j$) with i, j∈{r(k)|k<$\ell$ } for which the pattern (J, $\mathcal{A}$ ) matches σ from i to j, that is, $\tau_j$-$\tau_i$∈J and $a_i$ . . . $a_j$∈L($\mathcal{A}$). Note that not all stream elements ($\tau_k$, $a_k$) with i<k<j must be received for reporting the match. A timestamp pair is output as soon as the stream elements received so far witness the match.

For finding the matches the algorithm uses an NFA $\mathcal{C}$ that accepts the complement of the pattern NFA $\mathcal{A}$, i.e., L($\mathcal{A}$)=Σ*\L($\mathcal{C}$). The NFA $\mathcal{C}$ may either be given directly to the algorithm or it is obtained from the NFA $\mathcal{A}$ via the powerset construction in a preprocessing step. Note that using the powerset construction may result in an exponential blowup. However, $\mathcal{C}$'s construction is a preprocessing step and it is possible to apply various state-based reduction techniques to $\mathcal{A}$ first and to the resulting DFA. Furthermore, complementation is easy when $\mathcal{A}$ is a DFA. Also note that when $\mathcal{C}$ is given directly, it can be exponentially more succinct than $\mathcal{A}$.

Observe that there is no match from $\tau_i$ to $\tau_j$ if $\mathcal{C}$ witnesses the acceptance of $a_i$ . . . $a_j$, where gaps caused by stream elements that have not been received so far are instantiated with words in Σ*. Otherwise, there is a match, since $\mathcal{C}$ accepts the complement of $\mathcal{A}$. In this case, $\mathcal{C}$ rejects any instantiation, no matter how the gaps are instantiated. This explains why $\mathcal{C}$ was worked with, instead of $\mathcal{A}$: Checking that some instantiation is accepted by $\mathcal{C}$ is easier than checking that all instantiations are accepted by $\mathcal{C}$.

For the remainder of this part of the discussion, the pattern (J, $\mathcal{A}$) and an NFA $\mathcal{C}$=(Q, Σ, $q_0$, δ, F) with L($\mathcal{A}$)=Σ*\L($\mathcal{C}$) is fixed. It is assumed that $\mathcal{C}$ is complete (i.e., for all p∈Q and b∈Σ, there is q∈Q with q∈δ(p, b)). Furthermore, it is assumed that $\mathcal{C}$ is reverse complete (i.e., for all q∈Q and b∈Σ, there is p∈Q with q∈δ(p, b)) or $\mathcal{C}$ has an accepting sink state (i.e., there is q∈F with q∈δ(q, b), for all b∈Σ). These assumptions are without loss of generality. They can always be met by adding extra states without altering the automaton's language.

Algorithm: The algorithm maintains a doubly-linked list s that stores the segments of the received stream elements, where a segment maintains information about the received elements with no gaps between them. To simplify notation, a segment is identified with its corresponding word of the received stream elements. The segments in the list s are ordered by the timestamp of their first stream element. Note that each segment spans over an interval [τ, τ']⊆ℚ$_{\geq 0}$, where τ is the smallest timestamp of the segment's stream elements and τ' is the largest timestamp of the segment's stream elements. Concretely, a segment u has (1) the fields prev and next that point to the previous and next segment, respectively, (2) the field interval that stores the timestamps of the first and last letter in u, and (3) the field profile stores $\mathcal{C}$'s behavior over u, i.e., the transition profile $t_u^{\mathcal{C}}$. The following procedures are used for segments:

New(I, t) returns a new segment for the interval I and the transition profile t.

Add(s, u) adds the segment u to the ordered list of segments s and returns the new list head.

Merge(u, v) merges the segment u with the segment v. The updated fields of u are as follows. First, v is removed from the segment list, i.e., u.prev remains unchanged, u.next is set to v.next, and the previous pointer of the segment v.next is updated by pointing to u, provided it is not nil. Furthermore, u.interval is enlarged to also include u.interval. Finally, u.profile is multiplied by u.profile.

Gap(u, v) returns true iff there is a gap between the segments u and v. Note that the implementation of Gap depends on how gaps are identified. The implementation of the other procedures is straightforward and omitted.

The pseudocode of the pattern-matching algorithm (also referred to below as PatternMatcher) is presented in Listing 1. In line 2, the list s is initialized with the empty list. After initialization, PatternMatcher enters a nonterminating loop that continuously receives and processes stream elements. The loop body comprises three parts:

1. The first part (lines 4-7) first receives the new stream element (τ, a). It then checks the special case whether the one-letter word a matches. Finally, it updates the list s by inserting the newly created segment consisting of the single stream element (τ, a).

2. The second part (lines 8-14) iterates through the list s and merges segments whenever there is no gap between them. When merging two segments, the algorithm also checks for matches between those.

3. The third part (lines 15-21) iterates again through the list s. This iteration checks for matches spanning over multiple segments with gaps between them.

Listing 1:

```
1   procedure PatternMatcher(σ)
2     s ← nil
3     loop
4       (τ, α) ← receive element from stream σ
5       if 0 ∈ J and (τ, τ) not in the outer match set of t^C_{τ,a} then
6         output (τ, τ)
7       s ← Add(s, New({τ}, t^C_{τ,a}))
8       for v ← s.next; v ≠ nil; v ← v.next do
9         u ← v.prev
10        if not Gap(u, v) then
11          foreach τ ∈ U_{q∈C} u.profile(q) and κ ∈ U_{q∈C} v.profile(q)
                with κ - τ ∈ J
   and
12              (τ, κ) not in the inner match set between u.profile
                and v.profile
   do
13            output (τ, κ)
14          Merge(u, v)
15      t ← s.profile
16      for v ← s.next; v ≠ nil; v ← v.next do
17        ŝ ← g^C ∘ v.profile
18        foreach τ ∈ U_{q∈C} t̂(q) and κ ∈ U_{q∈C} ŝ(q) with κ and
19          (τ, κ) not in the inner match set between t and ŝ do
20          output (τ, κ)
21        t ← t ∘ ŝ
```

Figure 16:
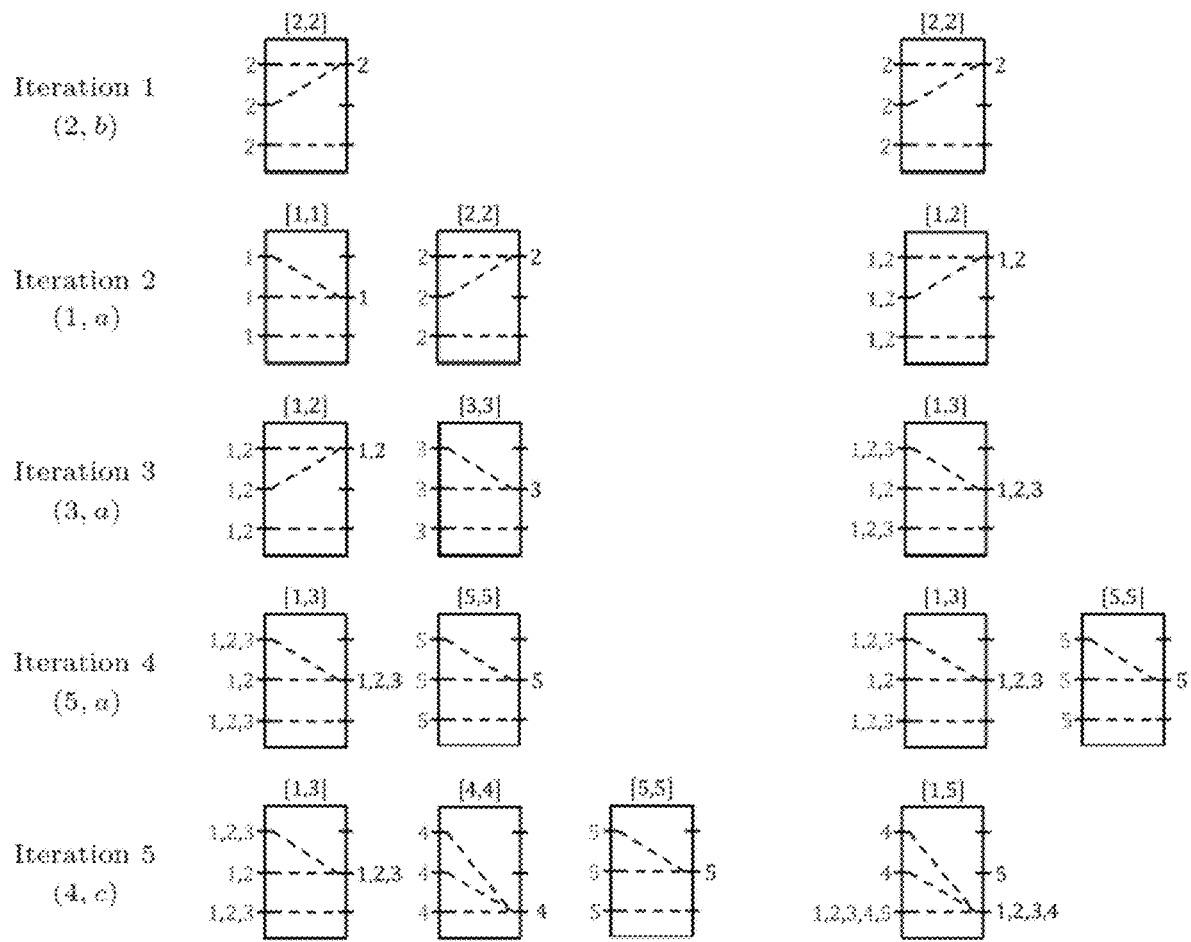
FIG. 16 shows transition profiles in a segment list of an out-of-order pattern matching algorithm.

Example Run. For illustration, consider the pattern ((0, 3], $\mathcal{A}$), where $\mathcal{A}$ is the DFA from Example 1 and the stream σ=(1, a)(2, b)(3, a)(4, c)(5, a) . . . . It is assumed that the stream elements are received in the order given by the function r: ℕ > ℕ with r(0)=1, r(1)=0, r(2)=2, r(3)=4, and r(4)=3. Note that the automaton $\mathcal{C}$ is easily obtained from $\mathcal{A}$ by swapping $\mathcal{A}$'s accepting and nonaccepting states. FIG. 16 shows the segments stored in the list s in the PatternMatcher's first five iterations. The left-hand side of FIG. 16 shows s after inserting the segment for the newly received stream element and the right-hand side of FIG. 16 shows s after merging segments with no gaps between them. Although PatternMatcher only uses $\mathcal{C}$, FIG. 16 also shows the annotations of $\mathcal{A}$'s transition profiles. The forward annotations are anyway identical to $\mathcal{C}$'s forward annotations.

In the first iteration, the singleton segment with the stream element (2, b) is created and inserted into the list s. This segment originates from the transition profile s from Example 5 for $\mathcal{A}$, where κ=2. Note that the segment's transition profile for $\mathcal{C}$ is identical to s with κ=2, except that all target states are also annotated with κ=2. Since s only contains one segment, both for loops (line 8 and line 16 of Listing 1) are not executed at all.

In the second iteration, the singleton segment for the stream element (1, a) is first created and inserted into the list s. The segment's transition profile originates from t also from Example 5, where τ=1. The transition profile for $\mathcal{C}$ is identical to t, except that only the target state 2 is annotated with τ=1. Note that although a∈L($\mathcal{A}$), no match is reported, since the segment does not satisfy the pattern's metric constraint (0, 3]. The first for loop is executed once. It is assumed that the procedure Gap returns false and the two segments in s are merged. No match is output. The second for loop is not executed at all.

In the third iteration, the stream element (3, a) is received. Similarly to the previous iteration, no match is output in line 6, since the pattern's metric constraint is not satisfied. The first for loop is executed once. It is assumed again that Gap returns false and the two segments in s are merged. This time however two matches are output, namely, (1; 3) and (2; 3). As in the previous iterations, the second for loop is not executed at all.

Figure 17:
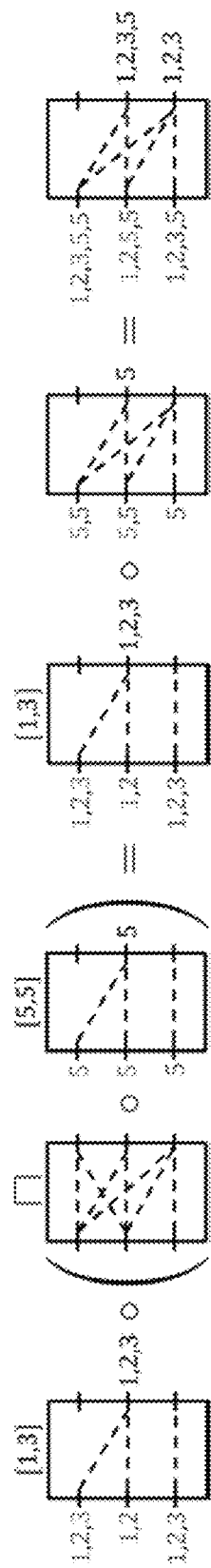
FIG. 17 schematically illustrates a gap between segments.

So far, the second for loop has not been executed. This changes in the fourth iterations when receiving the stream element (5, a). The first for loop does not merge any segments. The second for loop is executed once. FIG. 17 shows the involved transition profiles. Note that (1, 5), (2, 5), and (2, 3) are inner matches for $\mathcal{A}$. None of them is output. The first one, e.g., does not satisfy the pattern's metric constraint. All three matches are also inner matches for $\mathcal{C}$. This means that depending on how the gap is filled both $\mathcal{A}$ and $\mathcal{C}$ accept words with a suffix and a prefix of the corresponding segments. Finally, in the fifth iteration, the stream element (4, c) is received and the first for loop merges the three segments in s. No matches are output.

Correctness. The following theorem establishes PatternMatcher's soundness (i.e., only matches are output). It also establishes PatternMatcher's completeness (i.e., every match is output) under the additional assumption that each stream element is eventually received.

Theorem 13: If PatternMatcher(σ) outputs ($τ_i$, $τ_j$) then $τ_j$-$τ_i$∈J and $a_i$ . . . $a_j$∈L($\mathcal{A}$). The converse also holds, provided that r is surjective. Theorem 13 does not tell us in which iteration PatternMatcher reports a match. In fact, the algorithm's completeness does not depend on the loop's third part (the lines 15-21 in Listing 1). This part is however important in that matches are reported promptly, as established by the next theorem. The stream σ together with the function r determine a sequence of observations $w^0$, $w^1$, . . . ∈Obs(Σ), with $w^0$=([0, ∞), □). For each $\ell$=1, 2, . . . , $w^\ell$ is obtained from $w^{\ell-1}$ by transformation (T1), which inserts the stream element ($τ_{r(\ell-1)}$, $a_{r(\ell-1)}$), and possibly followed by (T2) transformations, which remove gaps between received stream elements.

Proof Sketch of Theorem 13: The algorithm's soundness is first proved. Obviously, if the output ($τ_i$, $τ_j$) originates from line 6 of Listing 1, then j=i, 0∈J, and $a_i$∉L($\mathcal{C}$) and hence $a_i$∈L($\mathcal{A}$). In the following, assume that the output ($τ_i$, $τ_j$) originates from line 13. Since u and v are segments, Ext($uv_{[τ_i,τ_j]}$) is a singleton set {w}, for some w∈Σ*. By Lemma 11(ii), $\mathcal{C}$ rejects the subword w spanning from $τ_i$ to $τ_j$. Hence, w∈L($\mathcal{A}$). The metric constraint J is obviously satisfied.

Finally, assume that the output ($τ_i$, $τ_j$) originates from line 20. Observe that at the beginning of iteration $\ell$ >0 of the for loop in the lines 16-21, it is the case that t= $t^\mathcal{C}_{u^\ell}$, with $u^\ell$:=$u_0$□$u_1$□ . . . □ $u_\ell$, where the lists contains the segments $u_0$, $u_1$, . . . , $u_n$. Note that for brevity, the interval for the "gap" letters is omitted, i.e., the letters of the form (I, □). Assume that iteration k>0 outputs ($τ_i$, $τ_j$). The timestamp $τ_i$ appears in the forward annotation of the transition profile t and $τ_j$ in the backward annotation of ŝ, and hence also of $u_k$.profile. For t and ŝ, it follows from Lemma 11(ii) that there is no word w∈Ext(($u^k$□$u_k$)$_{t[τ_i,τ_j]}$ with w∈L($\mathcal{C}$). Since $\mathcal{C}$ is the complement automaton of $\mathcal{A}$, it is concluded that Ext(($u^k$⊓$u_k$)$_{t[τ_i,τ_j]}$)↓L($\mathcal{A}$). Again, the metric constraint J is obviously satisfied.

It remains to prove the algorithm's completeness under the additional assumption that r is surjective. In the remainder of the proof, assume that $\tau_j-\tau_i \in J$ and $a_i, \ldots, a_j \in L(\mathcal{A})$. Let k be the iteration in which the last stream element between $\tau_i$ and $\tau_j$ is received. If i=j then line 6 outputs $(\tau_i, \tau_i)$. If i<j then after line 7 the list s contains at least two segments u and v that cover intervals that contain $\tau_i$ and $\tau_j$, respectively. Since s is ordered, these segments appear next to each other in s, starting with the one that contains $\tau_i$ and ending with the one that contains $\tau_j$. Line 13 outputs $(\tau_i, \tau_j)$, when merging these segments in the for loop in the lines 8-14.

Theorem 14: Let $\ell > 0$ and i, $j \in \{r(k) | k < \ell\}$, with $\tau_j - \tau_i \in J$ and $\mathrm{Ext}(w^\ell_{\uparrow[\tau_i,\tau_j]}) \subseteq L(\mathcal{A})$. PatternMatcher($\sigma$) outputs $(\tau_i, \tau_j)$ in iteration $\ell$, if has not output $(\tau_i, \tau_j)$ in a previous iteration.

Proof Sketch of Theorem 14: Without loss of generality, it is assumed that $w^\ell_{\uparrow[\tau_i,\tau_j]}$ contains at least one "gap" letter. Otherwise, as in Theorem 13, line 6 or line 13 output $(\tau_i, \tau_j)$ in one of the iterations $1, \ldots, \ell$. It follows that the lists contains at list two distinct segments after the for loop in the lines 8-14 that span over intervals containing $\tau_i$ and $\tau_j$, respectively. With a similar reasoning as in the proof of Theorem 13, one shows that the for loop in the lines 15-21 outputs $(\tau_i, \tau_j)$.

Trace Checking: In the following discussion, the pattern-matching algorithm discussed above is adapted to handle specifications given in the linear-time temporal logic (LTL). Industrial-strength extensions like the Property Specification Language (PSL) are handled similarly. In fact, the adaption carries over to any logic over infinite words that (i) is closed under negation and (ii) admits a translation into Buechi automata. Instances are, e.g., the linear-time μ-calculus and S1S. The resulting complexity may however differ due to the respective translation into Buechi automata.

Briefly recalling LTL's syntax and semantics: Let P be a finite, nonempty proposition set and Σ the alphabet $2^P$. LTL's syntax is given by the grammar $\varphi ::= p | \neg \varphi | \varphi \vee \varphi | \times \varphi \cup \varphi$, where p ranges over the propositions in P. LTL's semantics is defined as follows, where $\alpha_0 \alpha_1 \ldots \in \Sigma^\omega$.

$a_0 a_1 \ldots \models p$ iff $p \in a_0$ $a_0 a_1 \ldots \models \neg \varphi$ iff $a_0 a_1 \ldots \not\models \varphi$ $a_0 a_1 \ldots \models \varphi \wedge \psi$ iff $a_0 a_1 \ldots \models \varphi$ or $a_0 a_1 \ldots \models \psi$ $a_0 a_1 \ldots \models \times \varphi$ iff $a_1 a_2 \ldots \models \varphi$ $a_0 a_1 \ldots \models \varphi \cup \psi$ iff there is some $i \in \mathbb{N}$ such that
$a_i a_{i+1} \ldots \models \psi$ and $a_j a_{j+1} \ldots \models \varphi$, for all $j \in \mathbb{N}$ with $0 \leq j < i$ Furthermore, recall that an LTL formula φ of length n can be translated into a Buechi automaton $\mathcal{B}_\varphi$ with at most $2^{O(n)}$ states that accepts the infinite words $w \in \Sigma^\omega$ with $w \models \varphi$ [16].

In the following, let φ be an LTL formula. First, the Buechi automata $\mathcal{B}_{\neg \varphi}$ and $\mathcal{B}_\varphi$, is constructed from which it is possible to then obtain the NFAs $\mathcal{C}$ and $\mathcal{A}$ as follows. $\mathcal{C}$ is identical to $\mathcal{B}_{\neg \varphi}$, except that $\mathcal{C}$'s set of accepting states consists of the states from which $\mathcal{B}_{\neg \varphi}$ accepts some infinite word in $\Sigma^\omega$. This set of states can be determined in linear time in $\mathcal{B}_{\neg \varphi}$'s number of states. The construction of $\mathcal{A}$ from $\mathcal{B}\varphi$ is analogous. The overall construction is in the worst case exponential in φ's length. It holds that:

$L(\mathcal{C}) = \{w \in \Sigma^* | wu \not\models \varphi, \text{ for some } u \in \Sigma^\omega\}$, and $L(\mathcal{A}) = \{w \in \Sigma^* | wu \models \varphi, \text{ for some } u \in \Sigma^\omega\}$.

Furthermore, note that $L(\mathcal{C}) \cup L(\mathcal{A}) = \Sigma^*$, but not necessarily $L(\mathcal{C}) \cap L(\mathcal{A}) = \emptyset$. In the following, it is assumed without loss of generality that both C and $\mathcal{A}$ are complete, each with at most one rejecting state, which is a sink when it exists.

Listing 2 below shows the adaption TraceChecker of the pattern-matching algorithm PatternMatcher. Segments do not have the additional field complement, which stores, similar to the field profile, transition profiles of the NFA $\mathcal{A}$. The procedure New is changed accordingly. TraceChecker additionally makes use of the auxiliary procedure Output, which it calls in line 13 of listing 2 as follows:

Output (t, $\mathfrak{s}$) outputs the verdict τ if τ only occurs in t's forward annotation of $\mathcal{C}$'s sink state, provided the sink exists.

Output (t, $\mathfrak{s}$) outputs the verdict $\bar{\tau}$ if τ only occurs in $\mathfrak{s}$'s forward annotation of $\mathcal{A}$'s sink state, provided the sink exists.

Additionally, Output removes all timestamps in t's and $\mathfrak{s}$'s forward annotation for the respective automaton's sink state. Furthermore, when Output outputs a verdict τ or $\bar{\tau}$ then Output removes the timestamp τ in the forward annotation of the transition profiles of the segment in the list s with the interval that contains τ. The removal of the timestamps ensures that verdicts are output at most once.

| Listing 2: |
|---|
| 1. procedure TraceChecker (σ) |
| 2.     s ← nil |
| 3.     loop |
| 4.        (τ, α) receive element from stream σ |
| 5.        s ← Add (s, New ($\{\tau\}$), $t^\mathcal{C}_\tau t^\mathcal{A}_{\tau,\alpha}$)) |
| 6.        for v ← s.next; v ≠ nil; v ← v.next do |
| 7.           u ← v.prev |
| 8.           if not Gap(u, v) then |
| 9.             Merge(u, v) |
| 10.       t, $\mathfrak{s}$ ← s.profile, s.complement |
| 11.       for v ← s.next; v ≠ nil; v ← v.next do |
| 12.          t, $\mathfrak{s}$ ← t $\circ g^\mathcal{C} \circ$ v.profile, s $\circ g^\mathcal{A} \circ$ v.complement |
| 13.          Output(t, $\mathfrak{s}$) |

Theorem 15 below establishes TraceChecker's soundness and completeness. As above, let $\sigma = (\tau_0, a_0)(\tau_1 a_1) \ldots$ be a stream over Σ and r: $\mathbb{N} \to \mathbb{N}$ the injective function that determined the order in which the stream elements are received. Furthermore, let $w^0 w^1, \ldots \in \mathrm{Obs}(\Sigma)$ be the sequence of observations, where $w^0([0, \infty), \square)$ and for each $\ell = 1, 2, \ldots, w^\ell$ is obtained from $w^{\ell-1}$ by a transformation (T1), which inserts σ's stream elements $(\tau_{r(\ell-1)}, a_{r(\ell-1)})$, and possibly followed by (T2) transformations, which remove gaps between received stream elements.

Theorem 15:

Let $\ell = 1, 2, \ldots$ and $\tau = \tau_{r(i)}$, for some $i < \ell$.

TraceChecker(σ) outputs the verdict τ in its $\ell$ th iteration iff $\ell$ is the first iteration with vu $\models \varphi$, for every v∈Ext($w^\ell_{\uparrow[\tau,\infty)}$) and $u \in \Sigma^\omega$.

TraceChecker(σ) outputs the verdict $\bar{\tau}$ in its $\ell$ th iteration iff $\ell$ is the first iteration with vu$\not\models \varphi$, for every v∈Ext($w^\ell_{\uparrow[\tau,\infty)}$) and $u \in \Sigma^\omega$.

Proof Sketch of Theorem 15: The proof of (2) is omitted as it is analogous to (1). Obviously, in the (i+1)st iteration, the list s contains after line 5 a unique transition profile r that contains the timestamp τ in its forward annotation. It is easy to see that the for loop in the lines 6-9 maintains r's unique existence as an invariant, until the verdict r is output in line 13 in some iteration k≥i. Furthermore, as long as the transition profile r exists in the list s, the transition profile t at the end of the for loop in the lines 11-12 also contains τ in its forward annotation. Note that C is complete by assumption.

Let k≥i be any iteration before having output the verdict τ (including the iteration that outputs τ, provided that such an iteration exists). Furthermore, let $w'^k$ denote $w^k$ without $w^k$'s last letter (i.e., the letter of the form ([κ, ∞), □)). Note that $w'^k$ corresponds to the concatenation of the segments in the list s as done by the for loop in the lines 11-12. The following equivalences hold, from which (1) easily follows. The verdict τ is not output in the (k+1)st iteration iff $\tau \in \vec{t}(q)$, for some of $\mathcal{C}$'s accepting states q iff $v \in L(\mathcal{C})$, for some $v \in \text{Ext}(w'^k_{\uparrow[\tau,\infty)})$ iff $uv \models \varphi$, for some $v \in \text{Ext}(w^k_{\uparrow[\tau,\infty)})$ and $u \in \Sigma^\omega$. The first equivalence follows from the procedure's Output definition, the second equivalence from Lemma 9(b), and the third from $\mathcal{C}$'s construction.

TraceChecker does not make use of backward annotations, i.e., a transition profile only needs to be composed of a matrix and a forward annotation here. Second, the NFAs $\mathcal{C}$ or $\mathcal{A}$ may not possess any sink state. In such case, TraceChecker does not need to compute the respective NFA's transition profiles as it never outputs any respective verdict. In particular, when φ describes a liveness property, L($\mathcal{C}$)=Σ* and $\mathcal{C}$ does not have a sink state as at any point in time, it is possible to satisfy φ, i.e., any prefix w∈Σ* can be extended with a suffix u∈Σ$^\omega$ such that wu⊨φ holds. Third, the NFA C and its transition profiles suffice when only interested in φ's falsification. Analogously, the NFA $\mathcal{A}$ and its transition profiles suffice when only interested in φ's satisfaction.

Prototype implementations of PatternMatcher and TraceChecker were made in the Go programming language and evaluated, as discussed below.

Transition Profiles: The efficient composition of transition profiles is important. To this end, cache efficient data structures were used for transition profiles. More concretely, the columns and rows of Boolean matrices were represented as bit sets. For instance, and n×n Boolean matrix with n≤64 is represented by essentially 2n 64-bit integers. Furthermore, for matrix multiplication, which follows the native cubic matrix multiplication algorithm, bit operations on 64-bit integers are used for computing the rows and columns of the resulting matrix. Note that more sophisticated sub-O(n$^3$) matrix-multiplication algorithms exist. They do, however, not necessarily perform better in practice. Analogously, bit sets are used to represent the transition profiles' annotations. More concretely, the data structure for annotations is composed of an ordered array of timestamps and a bit set that represents the sets in which the annotation's timestamps occur. For instance, for an annotation g: $Q \rightarrow 2^{\mathbb{Q}_{\geq 0}}$ with |Q|≤64, there is a bit set with m 64-bit integers, where m is the number of timestamps in g's range.

The transition profiles' annotations are minimized. First, time-stamps are removed for which the metric constraint J is unsatisfiable. For instance, assume that the transition profile t spans over an interval [τ,τ']. If J is bounded with right bound r, then all timestamps κ with τ−κ≤r are removed from the set $\vec{t}(q)$, for each q∈Q. As an example, consider the transition profile spanning over the interval [1,5] in FIG. 16: the timestamps 1 and 2 are removed from its forward annotation, and 3-5 from its backward annotation.

Second, only representative timestamps are kept track of. For an annotation g: $Q \rightarrow 2^{\mathbb{Q}_{\geq 0}}$, the representatives are determined by the equivalence relation $\tau \sim_g \kappa$ that is defined as τ∈g(q) iff κ∈g(q), for all q∈Q. As an example, consider again the transition profile spanning over the interval [1, 5] in FIG. 16: the timestamps 1-4 of its forward annotation are equivalent, and 1-3 and 5 are equivalent in its backward annotation. Observe that timestamps τ, κ with $\tau \sim_g \kappa$ have the same behavior with respect to a transition profile's matrix. Only the largest or smallest timestamp of an equivalence class is kept. The others are output, which resembles the output of equivalent verdicts in an almost event-rate independent monitoring algorithm. Alternatively, one could, e.g., maintain a union-find structure that keeps track of all the timestamps and their equivalence classes. The representatives can be efficiently computed and the number of annotations becomes finite for a finite set of timestamps.

Segments: To simplify matters, Listing 1 provides for a doubly-linked list s to store segments. Furthermore, s is traversed three times for each received stream element. This is computationally wasteful. For instance, adding a newly created segment via the Add procedure in line 7 is in the worst case linear in the length of s. In contrast, the implementation according to an embodiment uses (doubly-linked) skip lists. The time complexity of the Add procedure reduces to 0 (log n) on average. Merging multiple segments in the loop in the lines 8-14 of Listing 1 remains straightforward for skip lists, which would be more difficult when using self-balancing search trees. (AVL trees, B-trees, etc.). Furthermore, instead of iterating through all segments, the merging starts from the newly added segment and iterates leftwards and rightwards, until hitting a gap between segments.

Finally, the loop in the lines 16-21 of Listing 1 is optimized for skip lists by storing and reusing intermediate results from previous iterations. Stored at an element's skip list level is the transition profile obtained from the multiplication of the transition profiles strictly between this element and the element's next element at the same skip list height. Note the skip lists have the advantage over self-balancing search trees that no rebalancing steps are necessary, which can validate some of the intermediate transition profiles.

Variants: Observe that the lines 15-21 in Listing 1 are only needed to output matches that span over multiple segments with gaps between them. If one is only interested in matches within segments, these lines can be removed. If every gap is eventually closed, completeness is not sacrificed. However, matches may not be anymore reported promptly. In this case, promptness is traded for less computation. Note that without lines 15-21, one could also directly work with the pattern NFA $\mathcal{A}$ instead of with its complement automaton $\mathcal{C}$ (with minor modifications for checking for matches), or could choose the one that is smaller.

If there is additional information about a gap (e.g., at most n stream elements are missing or only stream elements (τ, a)∈$\mathbb{Q}_{\geq 0}$×Γ with Γ⊆Σ are missing), it is possible to precompute and use corresponding transition profiles instead of $g^\mathcal{C}$ in line 17 in Listing 1. This can result in the earlier reporting of matches.

In practice, one may only be interested in matches for certain positions in a stream σ. For instance, to restrict the output to certain starting positions, these can be marked by extending the alphabet to Σ×{start, nostart}. The NFA $\mathcal{C}$ is extended correspondingly, i.e., alter the letters a∈Σ of the transitions from its initial state to (a, start). The letters of the other transitions are changed from a∈Σ to (a, nostart).

Without loss of generality, it is assumed here that the initial state has no incoming transitions.

An experimental evaluation was carried out using prototype tools which implemented Listings 1 and 2 above, and variants thereof. It was found that transition profiles should be minimized for better performance. Without minimization, one will quickly run out of memory as the sizes of the annotations grows for each received stream element. Furthermore, large annotations slow down the composition of transition profiles and the computation of the inner matches between transition profiles. It was also found that promptness is costly, in particular, when streams are highly unordered. Without promptness, fairly high throughputs are achieved and scalability is good. Without promptness, the compositions in an iteration are local to the element received. In particular, the number of compositions is bounded by a constant, namely, two in the setup which was evaluated. In contrast, with promptness, the compositions are not locally bounded. Promptness requires to carry out several compositions of transition profiles in each iteration across the segments (around log n compositions, where n is the number of segments). Although each composition is fast (usually within a fraction of a millisecond), this still adds up. It was also found that scalability seems fairly robust for different patterns (e.g., automata structure, number of states, and intervals). One reason for this is that the matrices are encoded as 64-bit integer arrays and use bit operations on this encoding. Note that for the considered pattern automata, the sizes of the resulting matrix data structure are all equal. Another reason is that composing transition profiles (e.g., matrix multiplication) shows fairly similar performance for different automata.

Figure 18:
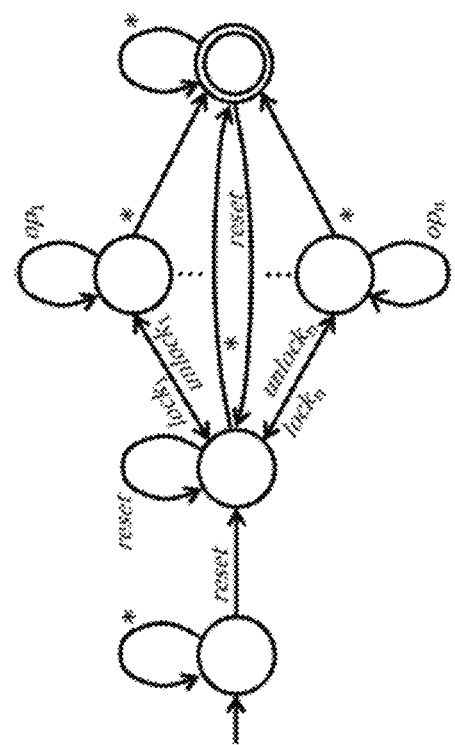
FIG. 18 schematically illustrates pattern automata.
Figure 18:
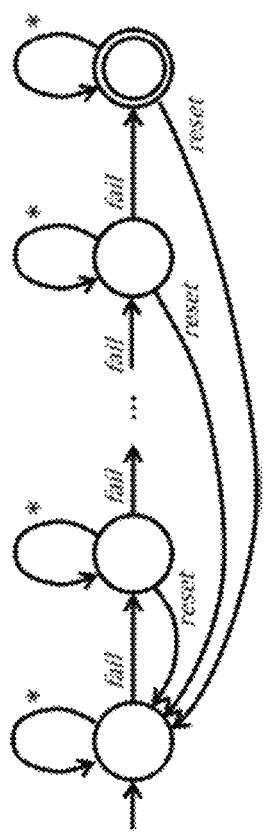

FIG. 18 shows two families CNT (left-handed side) and MUX (right handed side) of pattern automata used in experiments for PatternMatcher.

Figure 19:
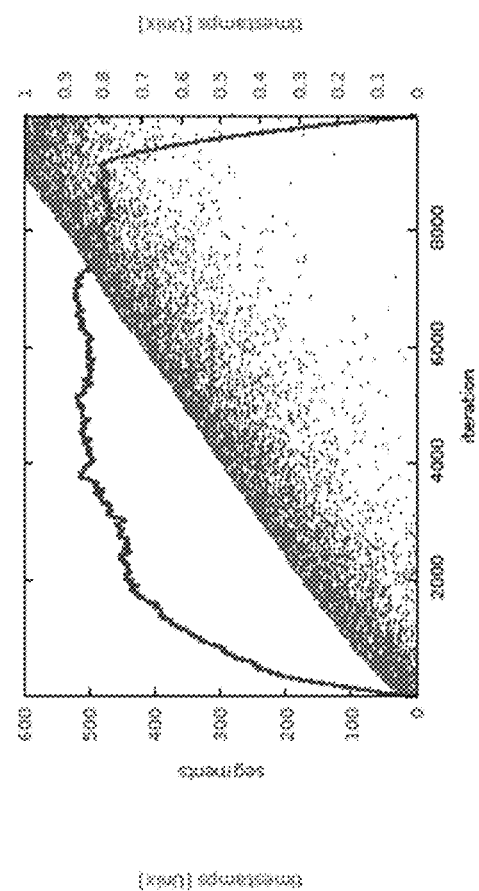
FIG. 19 graphically shows out-of-orderness for $\lambda=0.01$ (left) and $=0:1$ (right) of event streams spanning over one second and with an event rate 10,000, together with the number of segments.
Figure 19:
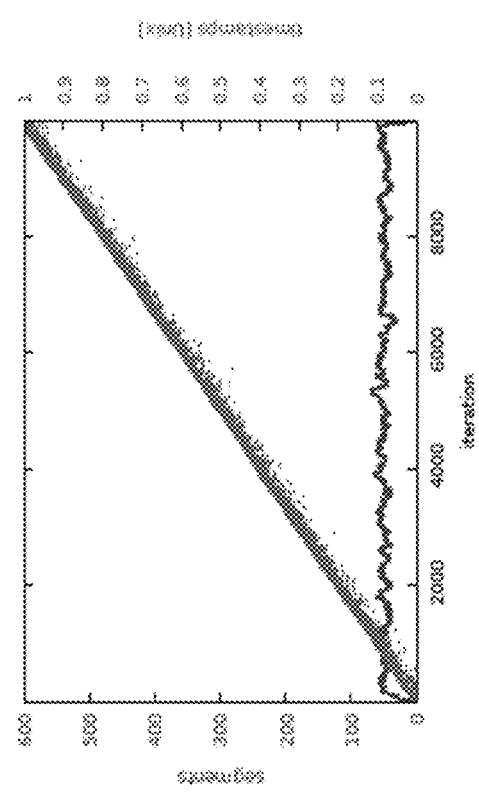
Figure 20:
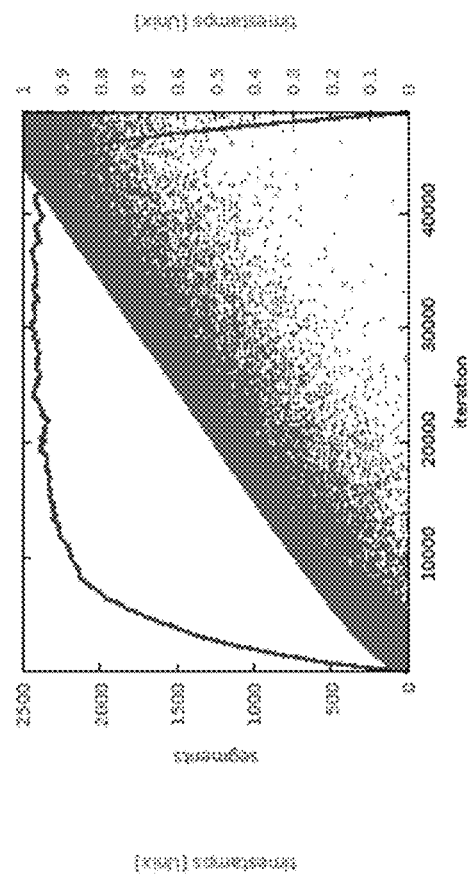
FIG. 20 shows out-of-orderness for $\lambda=0.01$ (left) and $=0.1$ (right) of event streams spanning over one second and with an event rate 50,000.
Figure 20:
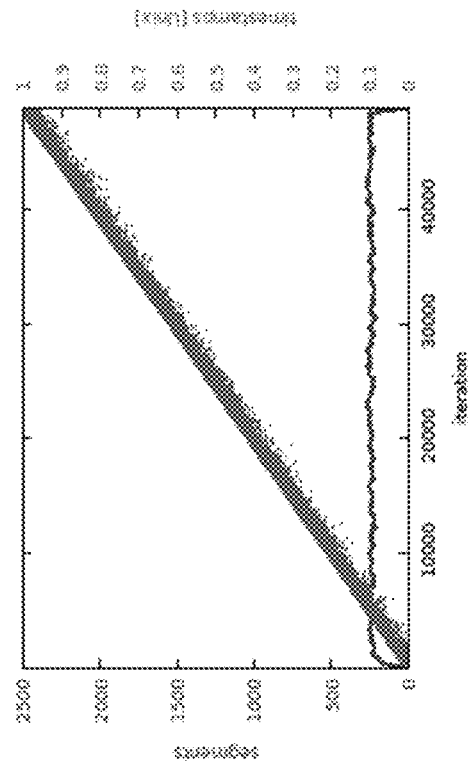

FIG. 20 shows out-of-orderness for λ=0.01 (left) and λ=0.1 (right) of event streams spanning over one second and with an event rate 50,000. Thus, FIG. 20 shows the "out-of-orderness" of event streams with a higher event rate than in FIG. 19, namely, 50,000 instead of 10,000.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for processing an out-of-order data stream, the method comprising:
   inserting a new data stream element into a segment list according to a timestamp of the new data stream element;
   identifying whether there are missing data stream elements between segments in the segment list;
   merging the segments which have no missing data stream elements between them; and
   aggregating values of the data stream elements using a sliding window over out-of-order data stream elements in the merged segment,
   wherein each of the segments includes a left-most sliding window and a right-most sliding window, wherein the values of the data stream elements are aggregated by moving the right-most sliding window of a first one of the segments to the right and computing data aggregations in each window until a left bound of the right-most sliding window of the first one of the segments matches with a left bound of the left-most sliding window of a second one of the segments, the second one of the segments spanning a time window that is later than the first one of the segments, and wherein the computed data aggregations for each of the windows are output.

2. The method according to claim 1, further comprising removing data stream elements between a right bound of the left-most sliding window of the first one of the segments and the left bound of the right-most sliding window of the second one of the segments.

3. The method according to claim 2, wherein a plurality of pairs of segments are merged in parallel.

4. The method according to claim 1, wherein the segment list is a skip list which stores partial data aggregations, the segments being ordered ascendingly by timestamps of their stream elements, and wherein the new data stream element is inserted into the skip list as a new singleton segment.

5. The method according to claim 4, wherein the skip list includes a plurality of buckets into which data stream elements of the data stream are insertable in parallel.

6. The method according to claim 1, further comprising inserting a gap element for an identified missing data stream element.

7. The method according to claim 6, wherein the gap element has meta-information which includes a timestamp of a singleton interval and a sequence number of the missing data element having the timestamp together with an end marker.

8. The method according claim 1, further comprising providing a lexicographical ordering of the data stream elements by annotating each data stream element of the data stream from a plurality of data producers with sequence numbers.

9. The method according to claim 8, further comprising filtering some of the data stream elements out of the data stream and inserting gap elements annotated with the same sequence numbers as the data stream elements which were filtered out.

10. The method according to claim 1, further comprising inserting a gap element for an identified missing data stream element, the inserted gap element being annotated with meta-information including a timestamp of a time window of the segments, a data producer and a sequence number.

11. The method according to claim 10, wherein the data producer is a data producer of a first data stream element in the time window, and wherein the sequence number comprises two parts, a first part having a sequence number of the first data stream element and a second part having a counter value of a number of time windows that start at the timestamp.

12. The method according to claim 1, wherein a tree is stored for each segment in the segment list, wherein the data stream elements of the segments are aggregated using an associative operator from left to right, and wherein the subtrees of the trees of the segments are reused during the aggregation.

13. A system comprising one or more processors which, alone or in combination, are configured to provide for execution of a method for processing an out-of-order data stream, the method comprising:
- inserting a new data stream element into a segment list according to a timestamp of the new data stream element;
- identifying whether there are missing data stream elements between segments in the segment list;
- merging the segments which have no missing data stream elements between them; and
- aggregating values of the data stream elements using a sliding window over out-of-order data stream elements in the merged segment,
- wherein each of the segments includes a left-most sliding window and a right-most sliding window, wherein the values of the data stream elements are aggregated by moving the right-most sliding window of a first one of the segments to the right and computing data aggregations in each window until a left bound of the right-most sliding window of the first one of the segments matches with a left bound of the left-most sliding window of a second one of the segments, the second one of the segments spanning a time window that is later than the first one of the segments, and wherein the computed data aggregations for each of the windows are output.

14. A tangible, non-transitory computer-readable medium having instructions thereon which, upon being executed by one or more processors, alone or in combination, provide for execution of a method for processing an out-of-order data stream, the method comprising:
- inserting a new data stream element into a segment list according to a timestamp of the new data stream element;
- identifying whether there are missing data stream elements between segments in the segment list;
- merging the segments which have no missing data stream elements between them; and
- aggregating values of the data stream elements using a sliding window over out-of-order data stream elements in the merged segment,
- wherein each of the segments includes a left-most sliding window and a right-most sliding window, wherein the values of the data stream elements are aggregated by moving the right-most sliding window of a first one of the segments to the right and computing data aggregations in each window until a left bound of the right-most sliding window of the first one of the segments matches with a left bound of the left-most sliding window of a second one of the segments, the second one of the segments spanning a time window that is later than the first one of the segments, and wherein the computed data aggregations for each of the windows are output.

15. The system according to claim 13, wherein the method further comprises removing data stream elements between a right bound of the left-most sliding window of the first one of the segments and the left bound of the right-most sliding window of the second one of the segments.

16. The system according to claim 15, wherein a plurality of pairs of segments are merged in parallel.

17. The tangible, non-transitory computer-readable medium according to claim 14, wherein the method further comprises removing data stream elements between a right bound of the left-most sliding window of the first one of the segments and the left bound of the right-most sliding window of the second one of the segments.

18. The tangible, non-transitory computer-readable medium according to claim 17, wherein a plurality of pairs of segments are merged in parallel.

* * * * *